(12) United States Patent
Kim et al.

(10) Patent No.: US 10,731,900 B2
(45) Date of Patent: Aug. 4, 2020

(54) REFRIGERATOR

(71) Applicant: LG ELECTRONICS INC., Seoul (KR)

(72) Inventors: Seokhyun Kim, Seoul (KR); Heayoun Sul, Seoul (KR); Minkyu Oh, Seoul (KR); Jeehoon Choi, Seoul (KR); Hyoungkeun Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 241 days.

(21) Appl. No.: 15/926,553

(22) Filed: Mar. 20, 2018

(65) Prior Publication Data

US 2018/0274827 A1 Sep. 27, 2018

(30) Foreign Application Priority Data

Mar. 21, 2017 (KR) .................. 10-2017-0035607

(51) Int. Cl.
  *F25B 21/02* (2006.01)
  *F25B 21/04* (2006.01)
  *G05D 23/19* (2006.01)

(52) U.S. Cl.
  CPC .............. *F25B 21/02* (2013.01); *F25B 21/04* (2013.01); *F25B 2321/0211* (2013.01);
  (Continued)

(58) Field of Classification Search
  CPC .............. F25B 21/02; F25B 2321/0211; F25D 2600/06
  See application file for complete search history.

(56) References Cited

U.S. PATENT DOCUMENTS 3,194,023 A 7/1965 Sudmeier
5,263,332 A * 11/1993 Park .................. F25D 29/00
62/157

(Continued)

FOREIGN PATENT DOCUMENTS

CN 104329898 2/2015
CN 205784105 12/2016

(Continued)

OTHER PUBLICATIONS

Kim Hyo Seok, Refrigerator using thermoelectronic semiconductor device and method for controlling, Feb. 2004, Full Document (Year: 2004).*

(Continued)

*Primary Examiner* — Elizabeth J Martin
*Assistant Examiner* — Nael N Babaa
(74) *Attorney, Agent, or Firm* — KED & Associates, LLP

(57) ABSTRACT

A refrigerator includes: a control unit for controlling a thermoelectric module, a cooling fan, and a heat-radiation fan, in which when the outside temperature exceeds the set temperature, the control unit rotates each of the cooling fan and the heat-radiation fan at a high-speed, in which, when the outside temperature is equal to or lower than the set temperature and the storage chamber temperature is in the upper limit range, the control unit rotates each of the cooling fan and the heat-radiation fan at a medium-speed lower than a high-speed, and in which, when the outside temperature is equal to or lower than the set temperature and the storage chamber temperature is lower than the upper limit range, the control unit rotates each of the cooling fan and the heat-radiation fan at a low-speed lower than a medium-speed.

20 Claims, 10 Drawing Sheets

(52) U.S. Cl.
CPC ... *F25B 2321/0212* (2013.01); *F25B 2500/12* (2013.01); *F25D 2600/02* (2013.01); *F25D 2600/06* (2013.01); *F25D 2700/02* (2013.01); *F25D 2700/12* (2013.01); *F25D 2700/121* (2013.01); *F25D 2700/14* (2013.01); *G05D 23/193* (2013.01); *G05D 23/1931* (2013.01)

(56) References Cited

U.S. PATENT DOCUMENTS

| | | | | |
|---|---|---|---|---|
| 2004/0187503 | A1* | 9/2004 | Davis | F25D 17/065 |
| | | | | 62/180 |
| 2008/0022696 | A1 | 1/2008 | Welle et al. | |
| 2012/0255720 | A1* | 10/2012 | Miller | F24F 11/70 |
| | | | | 165/217 |
| 2013/0219930 | A1* | 8/2013 | Shin | F25B 29/003 |
| | | | | 62/79 |
| 2017/0188720 | A1* | 7/2017 | Palmnas | F25D 17/08 |
| 2017/0203632 | A1 | 7/2017 | Westendarp | |

FOREIGN PATENT DOCUMENTS

| | | | |
|---|---|---|---|
| JP | H10-300305 | | 11/1998 |
| JP | H10300305 A | * | 11/1998 |
| JP | 2001-289550 | | 10/2001 |
| JP | 2001289550 A | * | 10/2001 |
| JP | 2012-092995 | | 5/2012 |
| KR | 10-0209696 | | 7/1999 |
| KR | 10-2002-0036896 | | 5/2002 |
| KR | 10-2004-0016659 | | 2/2004 |
| KR | 20040016659 A | * | 2/2004 |
| KR | 10-2004-0054924 | | 6/2004 |

OTHER PUBLICATIONS

Tokunaga Shigeomi, Thermoelectric module type electric refrigerator, Nov. 1998, Full Document (Year: 1998).*
Hatano Susumu, Thermoelectric module type electric refrigerator, Oct. 2001, Full Document (Year: 2001).*
U.S. Appl. No. 15/926,177, filed Mar. 20, 2018, Edward F. Landrum.
European Search Report dated Jul. 23, 2018 issued in Application No. 18162444.6.
U.S. Appl. No. 15/926,177, filed Mar. 20, 2018.
European Search Report dated Jul. 26, 2018 issued in Application No. 18162450.3.
U.S. Office Action dated Dec. 23, 2019 issued in U.S. Appl. No. 15/926,177.
Chinese Office Action dated Mar. 18, 2020 issued in CN Application No. 201810232706.9.

* cited by examiner

REFRIGERATOR

CROSS-REFERENCE TO RELATED APPLICATION

This application claims priority under 35 U.S.C. § 119 to Korean Application No. 10-2017-0035607, filed on Mar. 21, 2017, whose entire disclosure is hereby incorporated by reference.

BACKGROUND

1. Field

The present disclosure relates to a refrigerator, and more particularly, to a refrigerator in which a storage chamber is cooled by a thermoelectric module.

2. Background

A refrigerator is an apparatus that that receives and stores items, such as foods, medicines, or cosmetics, at relatively low temperatures to help prevent these items from decomposing or deteriorating. The refrigerator typically includes a storage chamber to accommodate the received stored items and a cooling device to cool the storage chamber.

One example of a cooling device is a refrigeration cycle device having a compressor, a condenser, an expansion device, and an evaporator that convert a refrigerant into different phases to perform heat exchanges for cooling. Another example of a cooling device is a thermoelectric module (TEM), which may be also referred to as a Peltier device. The thermoelectric module uses a phenomenon in which a temperature difference occurs between ends of a stack of different metals or other materials when current flows therebetween.

The refrigeration cycle device typically has relatively higher efficiency in comparison to the thermoelectric module, but the compressor used in the refrigeration cycle device may generate a relatively large amounts of noise during driving. Thus, the thermoelectric module may be relatively less efficient than the refrigeration cycle device but may generate less noise because the thermoelectric module does not include a compressor. The thermoelectric module may be used, for example, in a central processing unit (CPU) cooling device, a temperature control seat of a vehicle, a small refrigerator, and the like.

When a refrigerator includes a thermoelectric module that cools the storage chamber, the refrigerator may block (e.g., stop or significantly reduce) the voltage applied to the thermoelectric module when the storage chamber temperature reaches a target temperature. The refrigerator may then apply the voltage to the thermoelectric module again when the storage chamber temperature rises above the target temperature. For example, Korean Patent Publication No. KR 10-0209696 B1 (published on Jul. 15, 1999) describes that when a temperature in a refrigerator is lower than a set temperature, the operation of the refrigerator may be stopped, such as to turn off a heat-radiation fan and a thermoelectric module, and when the temperature in the refrigerator is higher than the set temperature, a heat-radiation fan and the thermoelectric module may be continuously turned on and off at regular intervals until the set temperature may be achieved.

In another example, the refrigerator may change the voltage applied to the thermoelectric module according to the size of a load applied to the refrigerator and based on whether the refrigerator is in equilibrium with a target temperature such that the change of the load can be dealt with more quickly. For example, Korean Patent Laid-Open Publication No. 2002-0036896A (published on May 17, 2002) discloses a refrigerator that applies a voltage to a thermoelectric module that may be in equilibrium with a target temperature.

In some examples, the load of the refrigerator may be influenced by the outside temperature of the refrigerator. For example, when the outside temperature is high, the load of the refrigerator may be relatively large to provide sufficient cooling, and the refrigerator applies a variable voltage to the thermoelectric module according to the size of the load, a high voltage may be applied to the thermoelectric module while the outside temperature may be high.

The above references are incorporated by reference herein where appropriate for appropriate teachings of additional or alternative details, features and/or technical background.

BRIEF DESCRIPTION OF THE DRAWINGS

The embodiments may be described in detail with reference to the following drawings in which like reference numerals refer to like elements and wherein.

DETAILED DESCRIPTION

Hereinafter, specific embodiments of the present disclosure will be described in detail with reference to the drawings.

Figure 1:
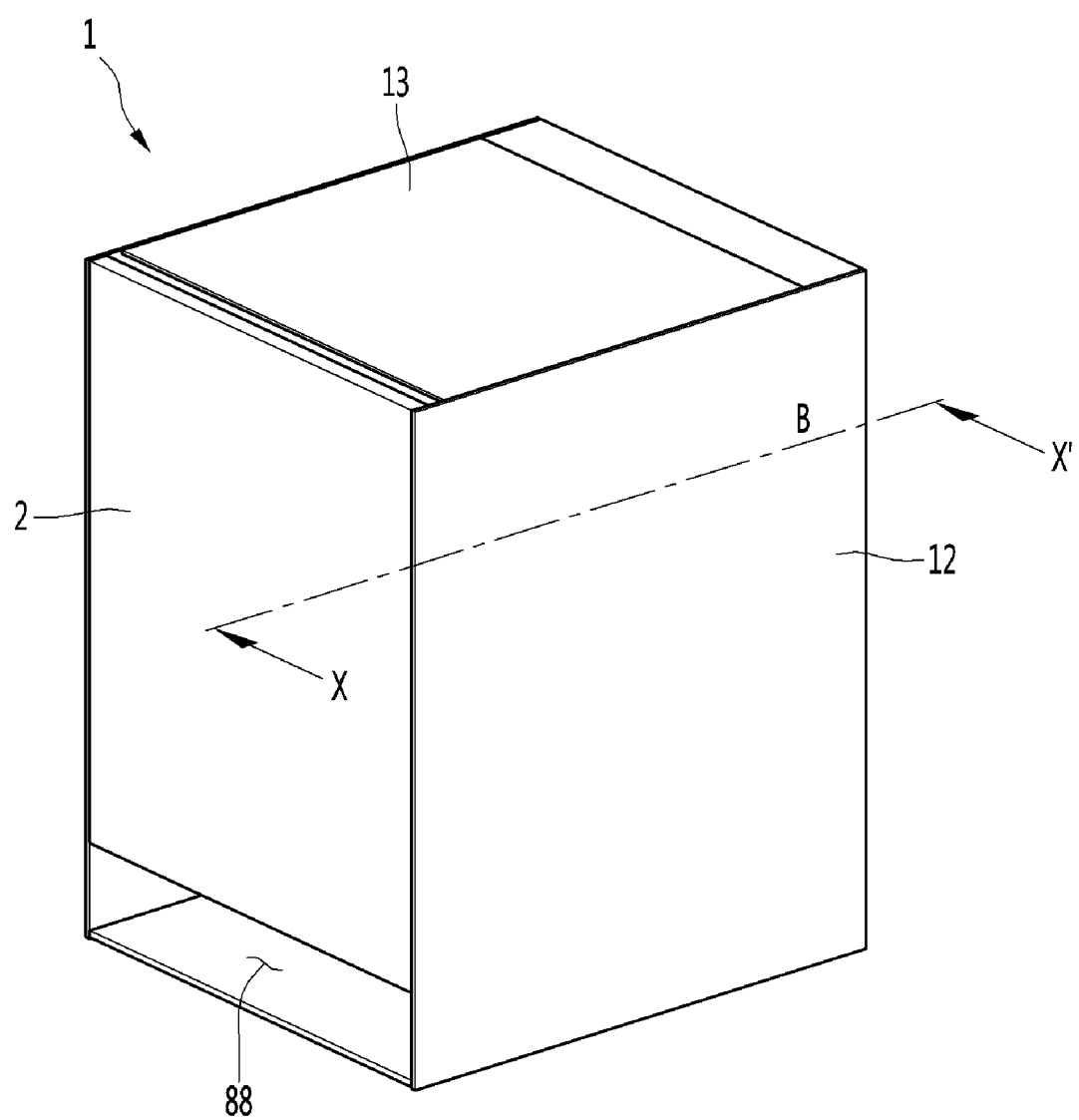
FIG. 1 is a perspective view illustrating a refrigerator according to an embodiment of the present disclosure.
Figure 2:
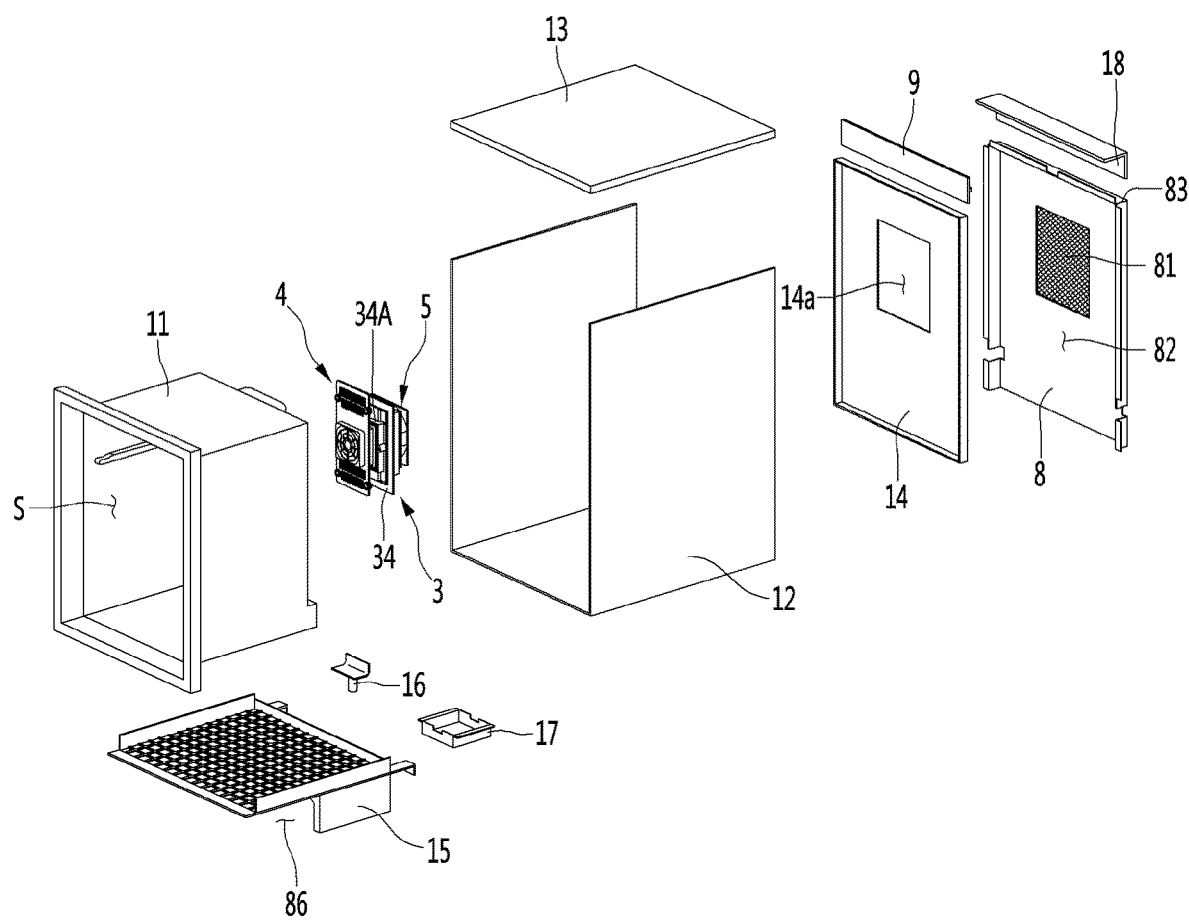
FIG. 2 is an exploded perspective view illustrating a refrigerator according to an embodiment of the present disclosure.
Figure 3:
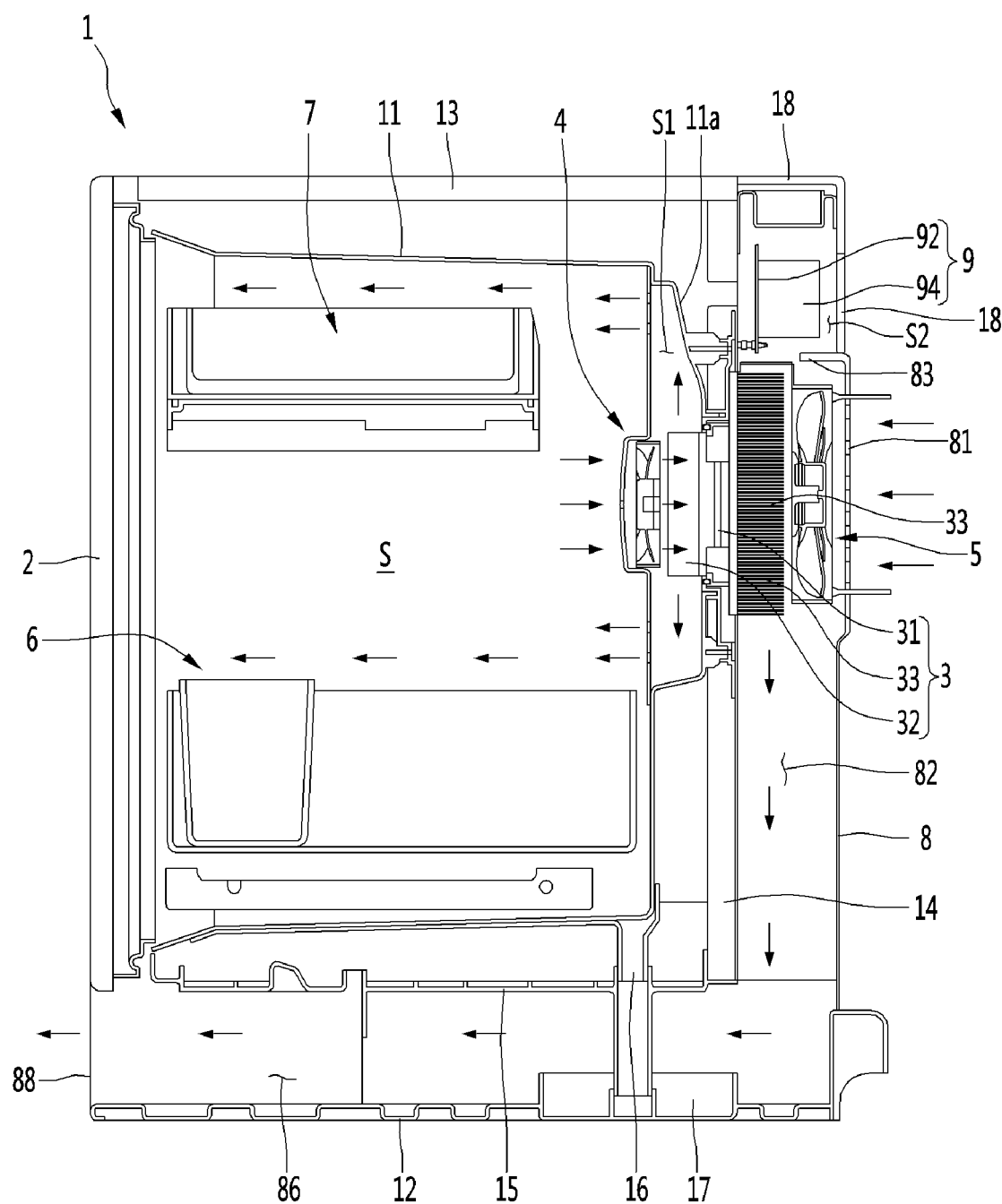
FIG. 3 is a sectional view taken along line X-X' illustrated in FIG. 1.
Figure 4:
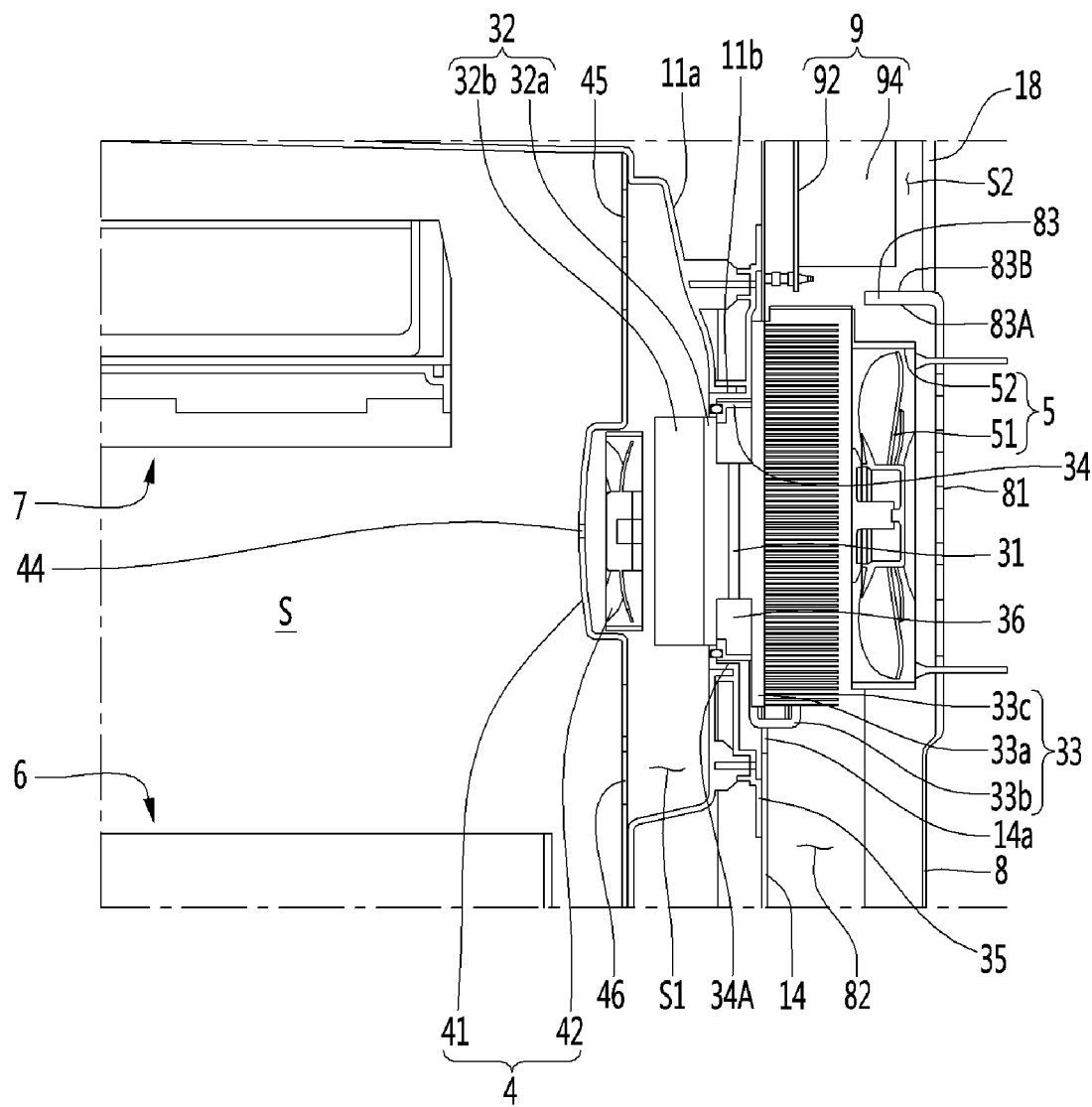
FIG. 4 is an enlarged sectional view illustrating the thermoelectric module illustrated in FIG. 3.

FIG. 1 is a perspective view illustrating a refrigerator according to an embodiment of the present invention, FIG. 2 is an exploded perspective view illustrating a refrigerator according to an embodiment of the present disclosure, FIG. 3 is a sectional view taken along line X-X' illustrated in FIG. 1, and FIG. 4 is an enlarged sectional view illustrating the thermoelectric module illustrated in FIG. 3. The refrigerator may include a main body 1 having a storage chamber S, a door 2 to open or close the storage chamber S, and a thermoelectric module (also referred to herein as a TEM or a thermoelectric cooler) 3 to cool the storage chamber S.

The main body 1 may be formed in a box shape. In one example, the height of the main body 1 may be at least 400 mm and less than 700 mm so as to be used as a bedside table.

Thus, the refrigerator of certain embodiments may be a bedside table type refrigerator having a low height. The bedside table type refrigerator may also function as a bedside table in addition to the food storage function. Such bedside table type refrigerator may be used while being provided next to a bed of a bedroom or next to a sofa, unlike a regular refrigerator that is housed in a kitchen. The height of the bedside table type refrigerator may be similar to the height of a bed or sofa and, thus, may be relatively lower in height than the regular refrigerator and may be more compact than the regular refrigerator. It should be noted that certain embodiments may be not limited to the bedside table type refrigerator described above, but may be applied to a refrigerator having the main body thereof having a height exceeding 700 mm.

The upper surface of the main body 1 may be horizontal. In this case, the user may use the upper surface of the main body 1 as a bedside table surface. The main body 1 may include a combination of a plurality of members. For example, the main body 1 may include an inner case 11, cabinets 12, 13 and 14, a cabinet bottom 15, a drain pipe 16, a tray 17, and a printed circuit board (PCB) cover 18.

The inner case 11 may include the storage chamber S. For example, the storage chamber S may be formed or otherwise positioned inside the inner case 11. One surface of the inner case 11 may be opened, and the opened surface may be opened and closed by the door 2. In one example, the front surface of the inner case 11 may be opened, and the door 2 may open and close the front surface of the inner case 111.

A thermoelectric module mounting portion (or thermoelectric module mounting recess) 11a may be formed in the inner case 11. The thermoelectric module mounting portion 11a may be formed such that a portion of the back surface of the inner case 11 protrudes rearward. The thermoelectric module mounting portion 11a may be formed closer to an upper surface than a bottom surface of the inner case 11.

A cooling flow path S1 may be provided in the thermoelectric module mounting portion 11a. The cooling flow path S1 may be a space formed inside the thermoelectric module mounting portion 11a and may communicate with the storage chamber S.

In addition, the thermoelectric module mounting portion 11a may include a thermoelectric module mounting hole 11b. At least a portion of the cooling sink 32, which will be described below, of the thermoelectric module 3 may be provided in the cooling flow path S1.

The cabinets 12, 13 and 14 may constitute an outer appearance of the refrigerator. The cabinets 12, 13, and 14 may be provided so as to surround the outer portion of the inner case 11. The cabinets 12, 13, and 14 may be spaced apart from the inner case 11. Between the cabinets 12, 13, and 14 and the inner case 11, a foamed material may be inserted to insulate the inner case 11. The cabinets 12, 13, and 14 may be formed by combining a plurality of members. The cabinets 12, 13 and 14 may include, respectively, an outer cabinet 12, a top cover 13, and a back plate 14.

The outer cabinet 12 may be provided outside the inner case 11. More specifically, the outer cabinet 12 may be located on the left, right, and lower sides of the inner case 11. However, the positional relationship between the outer cabinet 12 and the inner case 11 may be changed as needed.

The outer cabinet 12 may be provided to cover the left surface, the right surface and the bottom surface of the inner case 11. The outer cabinet 12 may be provided to be spaced apart from the inner case 11. The outer cabinet 12 may constitute the left surface, the right surface and the bottom surface of the refrigerator. The outer cabinet 12 may be formed of a metal material or a synthetic resin material.

The outer cabinet 12 may be configured with a plurality of members. The outer cabinet 12 may include, for example, a base forming an outer appearance of the bottom surface of the refrigerator, a left cover provided at the upper left of the base, and a right cover provided at the upper right of the base. In this case, the material of at least one of the base, the left cover, and the right cover may be different. For example, the base may be formed of a synthetic resin material, and the left and right plates may be formed of a metal material, such as steel or aluminum.

In another example, the outer cabinet 12 may be configured as a single member. In this case, the outer cabinet 12 may be configured with a curved or bent lower plate, a left plate, and a right plate. In a case in which the outer cabinet 12 may be configured as one member, and the outer cabinet may be formed of a metal material, such as steel or aluminum.

The top cover 13 may be provided on the upper side of the inner case 11. The top cover 13 may constitute the upper surface of the refrigerator. The user may use the upper surface of the top cover 13 as the upper surface of the bedside table.

The top cover 13 may be formed in a plate shape, and the top cover 13 may be formed of a wood material, such that the outer appearance of the refrigerator may appear more refined. In general, the upper surface of the bedside table may be mainly made of wood material, and the user may feel the use of the bedside table of the refrigerator more intuitively.

The top cover 13 may be provided to cover the upper surface of the inner case 11. At least a portion of the top cover 13 may be provided to be spaced apart from the inner case 11.

The back plate 14 may extend vertically. The back plate 14 may be provided behind the inner case 11. The back plate 14 may be provided on the lower side of the top cover 13. The back plate 14 may be provided to face the back surface of the inner case 11 in the front-rear direction. The back plate 14 may be positioned to be in contact with the inner case 11. The back plate 14 may be provided to be close to (e.g., cover) the thermoelectric module mounting portion 11a of the inner case 11.

The back plate 14 may include a through-hole 14a through which the thermoelectric module 3 passes. The through-hole 14a may be formed at a position corresponding to the thermoelectric module mounting hole 11b of the inner case 11. The size of the through-hole 14a may be equal to or greater than the size of the thermoelectric module mounting hole 11b (see FIG. 4) of the inner case 11.

The cabinet bottom 15 may be positioned below the inner case 11. The cabinet bottom 15 may support the inner case 11 from below. The cabinet bottom 15 may be provided between the outer bottom surface of the inner case 11 and the inner bottom surface of the outer cabinet 12. The cabinet bottom 15 may separate the inner case 11 from the inner bottom surface of the outer cabinet 12. The cabinet bottom 15 may form a lower heat-radiation flow path 86 (see FIG. 3) together with the inner surface of the outer cabinet 12.

The drain pipe 16 may communicate with the storage chamber S. The drain pipe 16 may be connected to the lower portion of the inner case 11 and may discharge water generated by defrosting or the like in the inner case 11.

The tray 17 may be located below the drain pipe 16 and may accommodate water that drops from the drain pipe 16. The tray 17 may be provided between the cabinet bottom 15 and the outer cabinet 12. The tray 17 may be located in the lower heat-radiation flow path 86 (see FIG. 3).

The PCB cover 18 may cover the control unit 9. The PCB cover 18 may be provided on the upper portion of the heat-radiation cover 8. The PCB cover 18 may cover the rear side and/or the upper side of the control unit 9.

The door 2 may be coupled to the main body 1, and the manner and number of the coupling thereof may be not limited to the specific configurations shown in the drawings. For example, the door 2 may be a single door or a plurality of doors that may be opened and closed by a hinge. Hereinafter, the door 2 will be described a case of a drawer-type door slidably connected to the main body 1 in the front-rear direction, as an example.

The door 2 may be coupled to the front surface of the main body 1. The door 2 may cover the opened front face of the inner case 11 and may open and close the storage chamber S. The door 2 may be formed of a wood material or may include a layer of wood, but may be not limited thereto. Between the lower end of the door 2 and the lower end of the outer cabinet 12, a heat-radiation flow path outlet 88 communicating with the lower heat-radiation flow path 86 may be formed.

The thermoelectric module 3 may keep the temperature of the storage chamber S low by using the Peltier effect. The thermoelectric module 3 may include a thermoelectric element 31, a cooling sink 32, and a heat sink 33. The thermoelectric element 31 may include a low-temperature portion (or low-temperature surface) and a high-temperature portion (or high-temperature surface), and the temperature difference between a low-temperature portion and a high-temperature portion may be determined according to the voltage applied to the thermoelectric element 31.

The thermoelectric element 31 may be provided between the cooling sink 32 and the heat sink 33 and may be in contact with the cooling sink 32 and the heat sink 33, respectively. A low-temperature portion of the thermoelectric element 31 may be in contact with the cooling sink 32, and a high-temperature portion of the thermoelectric element 32 may be in contact with the heat sink 33.

The thermoelectric module 3 may further include a module frame 34 and a heat insulating member (or heat insulator) 36, as illustrated in FIG. 4. The module frame 34 may have a hollow shape. For example, the module frame 34 may have a space that may accommodate the heat insulating member 36 and the thermoelectric element 31. The module frame 34 and the heat insulating member 36 may protect the thermoelectric element 31.

The heat insulating member 36 may be provided so as to surround the outer periphery of the thermoelectric element 31. The heat insulating member 36 may be provided, for example, so as to surround the upper surface, the left surface, the lower surface, and the right surface of the thermoelectric element 31. The thermoelectric element 31 may be located in the heat insulating member 36. The heat insulating member 36 may include a thermoelectric element accommodation hole opened in a front-rear direction, and the thermoelectric element 31 may be located in the thermoelectric element receiving hole. The heat insulating member 36 may be provided inside the module frame 34 together with the thermoelectric element 31 and may be protected by the module frame 34.

The thickness of the heat insulating member 36 in front-rear direction may be thicker than the thickness of the thermoelectric element 31. The hear insulating member 36 may help to prevent heat from being conducted to the outside of the periphery of the thermoelectric element 31, thereby increasing the efficiency of the thermoelectric element 31. For example, the periphery of the thermoelectric element 31 may be surrounded by the heat insulating member 36, and the heat emitted from the heat sink 33 may be minimized to be transmitted to the cooling sink 32 through the module frame 34.

The refrigerator may further include a thermoelectric module holder 35 to fix the thermoelectric module 3 to the inner case 11 and/or the back plate 14. The thermoelectric module holder 35 may couple the thermoelectric module 3 with the inner case 11 and/or the back plate 14.

The thermoelectric module holder 35 may be coupled to the thermoelectric module mounting portion 11a of the inner case 11 and/or the back plate 14 by a fastening member (not illustrated) such as a screw. The thermoelectric module holder 35 may block the through-hole 14a of the back plate 14 together with the thermoelectric module 3.

The thermoelectric module holder 35 may include a hollow portion (or cavity) 34A. The hollow portion 34A may be formed by extending a portion of the thermoelectric module holder 35 forward. The module frame 34 may be inserted into and fitted into the hollow portion 34A and the hollow portion 34A may cover the outer periphery of the module frame 34. The front portion of the thermoelectric module 3 may be positioned in front of the through-hole 14a, and the rear portion of the thermoelectric module 3 may be positioned in the rear of the through-hole 14a.

The cooling sink 32 may be a cooling heat exchanger connected to a low-temperature portion of the thermoelectric element 31 and may cool the storage chamber S. The thermoelectric module 3 may be provided in front of the heat-radiation cover 8, and the cooling sink 32 may be provided closer to the inner case 11 than the heat sink 33. The cooling sink 32 may be provided in front of the thermoelectric element 31. The cooling sink 32 may be kept at a low-temperature by contact with a low-temperature portion of the thermoelectric element 31.

The heat sink 33 may be a heating heat exchanger connected to a high-temperature portion of the thermoelectric element 31 and may radiate the heat absorbed by the cooling sink 33. The heat sink 33 may be provided closer to the heat-radiation cover 8 than the cooling sink 32. The heat sink 33 may be kept at a high-temperature by contact with a high-temperature portion of the thermoelectric element 31. The heat sink 33 may be provided under the control unit 9, which will be described below.

One or more of the thermoelectric element 31, the cooling sink 32, or the heat sink 33 may be positioned to pass through the through-hole 14a. The thermoelectric module 3 may be provided such that the heat sink 33 penetrates through the through-hole 14a, the thermoelectric element 31 and the cooling sink 32 may be positioned in front of the through-hole 14a, and a portion of the heat sink 33 may be positioned at the rear of the through-hole 14a.

The cooling sink 32 may include a cooling plate 32a and a cooling fin 32b. The cooling plate 32a may be provided in contact with the thermoelectric element 31. A portion of the cooling plate 32a may be inserted into the heating element accommodating hole formed in the heat insulating member 36 so as to be in contact with the thermoelectric element 31. The cooling plate 32a may be positioned between the cooling fin 32b and the thermoelectric element 31, and the cooling plate 32a may be in contact with a low-temperature portion of the thermoelectric element 31 to transfer the heat of the cooling fin 32b to a low-temperature portion of the thermoelectric element 31.

The cooling plate 32*a* may be formed of a material having a high thermal conductivity, such as a metal. The cooling plate 32*a* may be located in the thermoelectric module mounting hole 11*b* of the inner case 11. The cooling plate 32*a* may be sized to substantially block the thermoelectric module mounting hole 11*b* of the inner case 11.

The cooling fin 32*b* may be provided in contact with the cooling plate 32*a*. The cooling fin 32*b* may protrude from one surface of the cooling plate 32*a*. The cooling fin 32*b* may be positioned in front of the cooling plate 32*a*. At least a portion of the cooling fin 32*b* may be located in the cooling flow path S1 in the thermoelectric module mounting portion 11*a* and may cause the air in the cooling flow path S1 to be cooled by heat exchange with the air therein.

The cooling fin 32*b* may have a plurality of fins to increase the heat exchange area with the air. The cooling fin 32*b* may be formed to guide the air in the vertical direction. Each of the plurality of fins constituting the cooling fin 33*b* may be configured with a vertical plate having a left side and a right side and provided long in a vertical direction.

The cooling fin 32*b* may be provided between the fan 42 of the cooling fan 4 and the thermoelectric element 31, and the cooling fin 32*b* may guide the air blown from the fan 42 of the cooling fan 4 to the upper discharge hole 45 and the lower discharge hole 46. The air blown from the fan 42 of the cooling fan 4 may be guided to the cooling fin 32*b* and dispersed upward and downward.

The heat sink 33 may be provided below the control unit 9 so as to be spaced apart from the control unit 9. The heat sink 33 may include a heat-radiation plate 33*a*, a heat-radiation pipe 33*b*, and a heat-radiation fin 33*c*.

The heat-radiation plate 33*a* may be provided so as to be in contact with the thermoelectric element 31. A portion of the heat-radiation plate 33*a* may be inserted into the element mounting hole formed in the heat insulating member 36 to be in contact with the thermoelectric element 31. The heat-radiation plate 33*a* may contact a high-temperature portion of the thermoelectric element 31 to conduct heat to the heat-radiation pipe 33*b* and the heat-radiation fin 33*c*. The heat-radiation plate 33*a* may be formed of a material having a high thermal conductivity. At least one of the heat-radiation plate 33*a* and the heat-radiation fin 33*c* may be provided in the through-hole 14*a* of the back plate 14.

The heat-radiation pipe 33*b* may be a heat pipe having a heat transfer fluid built therein. A portion of the heat-radiation pipe 33*b* may be in contact with the heat-radiation plate 33*a* while the other portion thereof may be provided through the heat-radiation fin 33*c*.

The heat transfer fluid inside the heat-radiation pipe 33*b* may evaporate at the portion of the heat-radiation pipe 33*b* contacting the heat-radiation plate 33*a*, and the heat transfer fluid may be condensed at the portion contacting the heat-radiation fin 33*c*. The heat transfer fluid may circulate in the heat-radiation pipe 33*b* by density difference and/or gravity and may transfer the heat of the heat-radiation plate 33*a* to the heat-radiation fin 33*c*.

The heat-radiation fin 33*c* may be in contact with at least one of the heat-radiation plate 33*a* or the heat-radiation pipe 33*b*, and the heat-radiation fin 33*c* separated from the heat-radiation plate 33*a* may be also connected to the heat-radiation plate 33*a* through the heat-radiation pipe 33*b*. When the heat-radiation fin 33*a* is adjacent to or in contact with the heat-radiation plate 33*a*, the heat-radiation pipe 33*b* may be omitted.

The heat-radiation fin 33*c* may include a plurality of fins provided perpendicularly to the heat-radiation pipe 33*b*. The heat-radiation fin 33*c* may guide the air blown from the heat-radiation fan 5, and the air guiding direction of the heat-radiation fin 33*c* may be different from the air guiding direction of the cooling fin 32*b*. For example, when the cooling fin 32*b* guides air in an up-down (vertical) direction, the heat-radiation fin 33*c* may guide the air in a left-right (horizontal) direction.

It may be preferable that the air guided by the heat-radiation fin 33*c* be formed so as not to flow toward the control unit 9, as much as possible. When the outside temperature is relatively high, and when the air guided to the heat-radiation fin 33*c* is guided to the control unit 9, the temperature of the control unit 9 may increase, and the control unit 9 may be overheated. On the other hand, when the air guided by the heat-radiation fin 33*c* does not flow toward the control unit 9, overheating of the control unit 9 by the heat of the air sucked from the outside may be prevented.

The heat-radiation fin 33*c* may include a plurality of fins formed to guide the air in the horizontal direction (in particular, the left-right direction in the front-rear direction and the left-right direction). For example, each of a plurality of fins constituting the heat-radiation fin 33*c* may be configured as a horizontal plate having an upper surface and a lower surface and provided to extend in a horizontal direction.

When the heat-radiation fin 33*c* is formed long in the vertical direction, a large amount of air may flow toward the control unit 9 along with the air guided by the heat-radiation fin 33*c*. On the other hand, when the heat-radiation fin 33*c* is formed to extend in the horizontal direction, as described above, air flowing toward the control unit 9 within the air guided by the heat-radiation fin 33*c* may be minimized.

The heat-radiation plate 33*a* may be positioned between the heat-radiation fins 33*c* and the thermoelectric elements 31 and the heat-radiation fins 33*c* may be located behind the heat-radiation plate 33*a*. The heat-radiation fin 33*c* may protrude rearward from the back surface of the radiating plate 33*a*. The heat-radiation fin 33*c* may be positioned behind the back plate 14. The heat-radiation fin 33*c* may be positioned between the back plate 14 and the heat-radiation cover 8, and may heat-exchanged with the outside air sucked by the heat-radiation fan 5 to radiate heat.

The refrigerator may further include a cooling fan 4 that circulates air to the cooling sink 32 of the thermoelectric module 3 and the storage chamber S. The refrigerator may further include a heat-radiation fan 5 to cause a flow of outside air to the heat sink 33 of the thermoelectric module 3. The cooling fan 4 may be provided in front of the thermoelectric module 3 and may be provided to face the cooling sink 32.

The cooling fan 4 may be provided inside the inner case 11. Forced convection may be performed between the cooling flow path S1 and the storage chamber S by the cooling fan 4. The cooling fan 4 may cause a flow of air in the storage chamber S to the cooling flow path S1, and a low-temperature air exchanged with the cooling sink 32 provided in the cooling flow path S1 may flow back to the storage chamber S so that the temperature in the storage chamber S may be kept low.

The cooling fan 4 may include a fan cover 41 and a fan 42. The fan cover 41 may be provided inside the inner case 11. The fan cover 41 may be provided vertically. The fan cover 41 may define the storage chamber S and the cooling flow path S1. The storage chamber S may be located in front of the fan cover 41, and the cooling flow path S1 may be located at the rear thereof.

The fan cover 41 may include an inner suction hole 44 and inner discharge holes 45 and 46. The number, size, and shape of the inner suction hole 44 and the inner discharge holes 45 and 46 may be varied, as needed. The inner discharging holes 45 and 46 may be oriented as an upper discharging hole 45 and a lower discharging hole 46. The upper discharge hole 45 may be formed above the inner suction hole 44, and the lower discharge hole 46 may be formed below the inner suction hole 44. With this configuration, the temperature distribution in the storage chamber S may be made more uniform.

The fan 42 may be provided in the cooling flow path S1 and provided behind the fan cover 41. The fan cover 41 may cover the fan 42 from the front thereof. The fan 42 may be provided to face the inner suction hole 44. The air in the storage chamber S may be sucked into the cooling flow path S1 through the inner suction hole 44 and may be cooled while exchanging heat with the cooling sink 32 of the thermoelectric module 3 when the fan 42 may be driven. The air cooled by the cooling sink 32 may be discharged to the storage chamber S through the inner discharge holes 45 and 46, and the temperature of the storage chamber S may be kept at a relatively low-temperature.

In one example, a portion of the air cooled by the cooling sink 32 may be guided upward and be discharged to the storage chamber S through the upper discharge hole 45, while the other portion thereof may be guided downward and be discharged to the storage chamber S through the lower discharge hole 46.

The heat-radiation fan 5 may be positioned behind the thermoelectric module 3. The heat-radiation fan 5 may be provided behind the heat sink 33 so as to face the heat sink 33 and may blow outside air to the heat sink 33. For example, the heat-radiation fan 5 may be oriented to face the outside air suction hole 81.

The heat-radiation fan 5 may include a fan 51 and a shroud 52 surrounding the outside of the fan 51. The fan 51 of the heat-radiation fan 5 may be an axial-flow fan. The heat-radiation fan 5 may suck outside air through the outside air suction hole 81 formed in the heat-radiation cover 8. The air sucked by the heat-radiation fan 5 may radiate heat the heat sink 33 while exchanging heat with the heat sink 33 located between the back plate 14 and the heat-radiation cover 8. A high-temperature air heat-exchanged with the heat sink 33 may be sequentially guided to the outside air flow path 82 and the lower heat-radiation flow path 86, and then be exhausted from the refrigerator through the heat-radiation flow path outlet 88 located on the lower side of the door 2.

The refrigerator may include at least one accommodation members (or drawers) 6 and 7 located in the storage chamber S. Foods may be placed or accommodated in the accommodation members 6 and 7. The types of accommodation members 6 and 7 may be not limited. For example, the accommodation members 6 and 7 may be shelves or drawers. Hereinafter, the examples in which the accommodation members 6 and 7 are drawers will be described.

Each of the accommodation members 6 and 7 may be configured to be slidable in the front-rear direction (e.g., outward through the opening). At least one pair of accommodation member rails corresponding to the number of the accommodation members 6 and 7 may be provided on the left inner surface and the right inner surface of the inner case 11, and each of the accommodation members 6 and 7 may be slidably fastened to the member rails. In one example in which the accommodation members 6 and 7 are connected to the door 2, the accommodation members 6 and 7 may be configured to move together with the door 2.

The refrigerator may further include a heat-radiation cover 8 that guides outside air to the heat sink 33 of the thermoelectric module 3. The heat-radiation cover 8 may be provided so as to substantially surround the heat sink 33. The heat-radiation cover 8 may protect the back plate 14 and the heat-radiation fan 5 from the rear of the back plate 14 and the heat-radiation fan 5.

The heat-radiation cover 8 may be provided on the back surface of the main body 1. The heat-radiation cover 8 may include an outside air suction hole 81 through which outside air may be sucked. The outer air suction holes 81 may be formed at positions corresponding to the thermoelectric module mounting holes 11b of the inner case 11 and the through-holes 14a of the back plate 14, respectively. The outside air suction hole 81 may be formed at a position corresponding to the heat-radiation fan 5. The outside air may be sucked into the space between the heat-radiation cover 8 and the main body 1 through the outside air suction hole 81.

An outside air flow path 82 that guides the air sucked into the outside air suction hole 31 may be formed between the main body 1 and the heat-radiation cover 8. The heat-radiation fan 5 may suck the outside air into the outside air suction hole 31 and may direct the outside air to the heat sink 33 of the thermoelectric module. When the heat-radiation fan 5 is driven, the air outside the refrigerator may be sucked into the outside air flow path 82 through the outside air suction hole 31 and may flow to the heat sink 33.

The heat-radiation cover 8 may be provided behind the back plate 14, and the heat-radiation cover 8 may be provided facing the back plate 14. The outer air flow path 82 may be formed between the heat-radiation cover 8 and the back plate 14. The outer air flow path 82 may be positioned between the front surface of the heat-radiation cover 8 and the back surface of the back plate 14.

At the time of operation of the heat-radiation fan 5, the air outside the refrigerator may be sucked into the refrigerator through the outside air suction hole 81. The air sucked into the outside air suction hole 81 may be heat-exchanged with the heat sink 33 to become heated, and the heated air may be guided to the outside air flow path 82.

The refrigerator may include a barrier 83 provided between the heat-radiation fan 5 and a control unit (or controller) 9, described below. One side 83A of the barrier 83 may be directed to the heat-radiation fan 5, and the other side 83B of the barrier 83 may be directed to the control unit 9. The barrier 83 may be located between the control unit accommodation space S2 and the outside air flow path 82. The control unit accommodation space S2 may accommodate the control unit 9. The barrier 83 may partition the control unit accommodation space S2 and the outside air flow path 82.

The barrier 83 may be positioned below the control unit 9. The barrier 83 may protrude from at least one of the main body 1 or the heat-radiation cover 8 and may be formed separately from the main body 1 and the heat-radiation cover 8. It may be possible for the barrier 83 to be coupled to at least one of the main body 1 or the heat-radiation cover 8. When the barrier 83 is formed on the main body 1, the barrier 83 may be protruded from the back plate 14. When the barrier 83 is formed on the heat-radiating cover 8, the barrier 83 may be formed on the upper portion of the heat-radiating cover 8. The barrier 83 may protrude from the heat-radiation cover 8 toward the space between the heat-radiation fan 5 and the control unit 9.

The refrigerator may further include the control unit 9 that manages an operation of the refrigerator. The control unit 9 may include a PCB 92 provided in the main body 1 and at least one circuit component 94 provided in the PCB 92. Such a circuit component 94 may be, for example, a capacitor, a transformer, a diode, a snubber, a snubber capacitor, or the like.

It may be preferable that the circuit component 94 be controlled to have a proper management temperature or lower in order to keep performance thereof and ensure reliability. Furthermore, the control unit 9 may be preferably installed at a position that does not reduce the volume of the storage chamber S as much as possible and may be installed outside the storage chamber S.

The control unit 9 may be provided at any position of the top, bottom, and side of the thermoelectric module 3 and preferably may be provided at a position which does not disturb the flow of air sucked from the outside, among the top, bottom, and side of the thermoelectric module 3. It may be preferable that the control unit 9 is provided on the opposite side of the outside air flow path 82 with respect to the heat sink 33.

The control unit 9 may be provided at a higher position than the heat sink 33 and/or the heat-radiation fan 5 when the outside air flow path 82 is formed to be elongated in the downward direction of the heat sink 33 with respect to the heat sink 33. The control unit 9 may be provided above the heat sink 33 so as to be spaced apart from the heat sink 33. In this example, the refrigerator may be compactly configured while maximizing a volume of the storage chamber S.

On the contrary, when the outside air flow path 82 is formed to be elongated in the direction of the upper side of the heat sink 33 with respect to the heat sink 33, the control unit 9 may be provided at a position which may be lower than positions of the heat sink 33 and/or the heat-radiation fan 5. In this case, the refrigerator may be also compactly configured while maximizing the storage chamber S volume.

At least a portion of the control unit 9 may be positioned above the barrier 83, and the barrier 83 may minimize the flow of the air that passes through the outside air suction hole 81 toward the control unit 9. The heat radiated from the heat sink 33 and the heat of air passing through the outside air flow path 82 may be partially transferred to the control unit 9 in a case where the distance between the control unit 9 and the heat sink 33 is relatively short.

In a case where the outside temperature of the refrigerator is higher than the normal room temperature, the temperature of the control unit 9 may be increased, and in a case where the outside temperature is higher than the normal temperature, the refrigerator may be preferably controlled not to overheat by the control unit 9.

Figure 5:
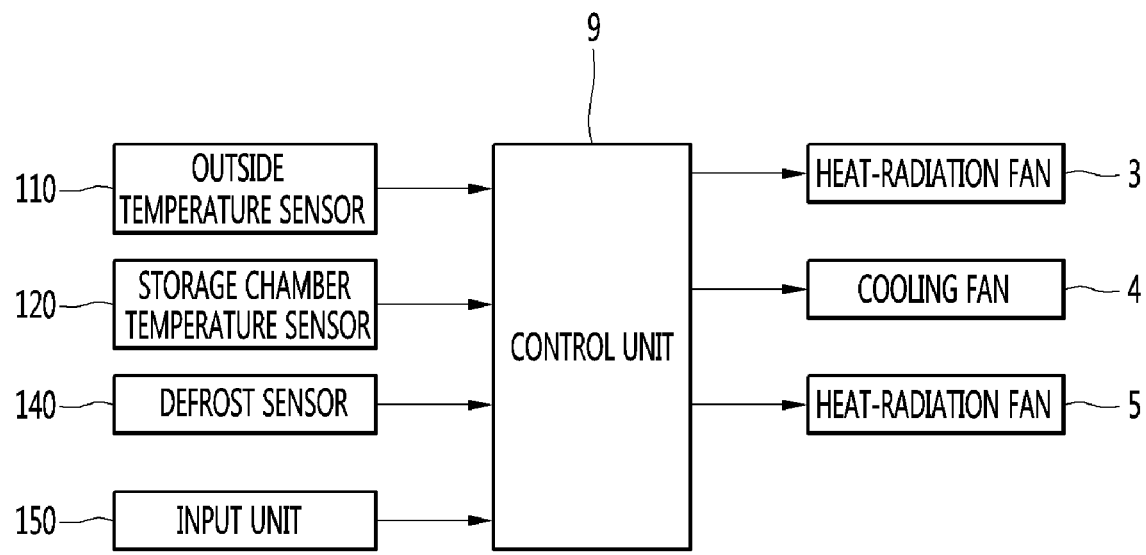
FIG. 5 is a control block diagram illustrating a refrigerator according to an embodiment of the present disclosure.
Figure 6:
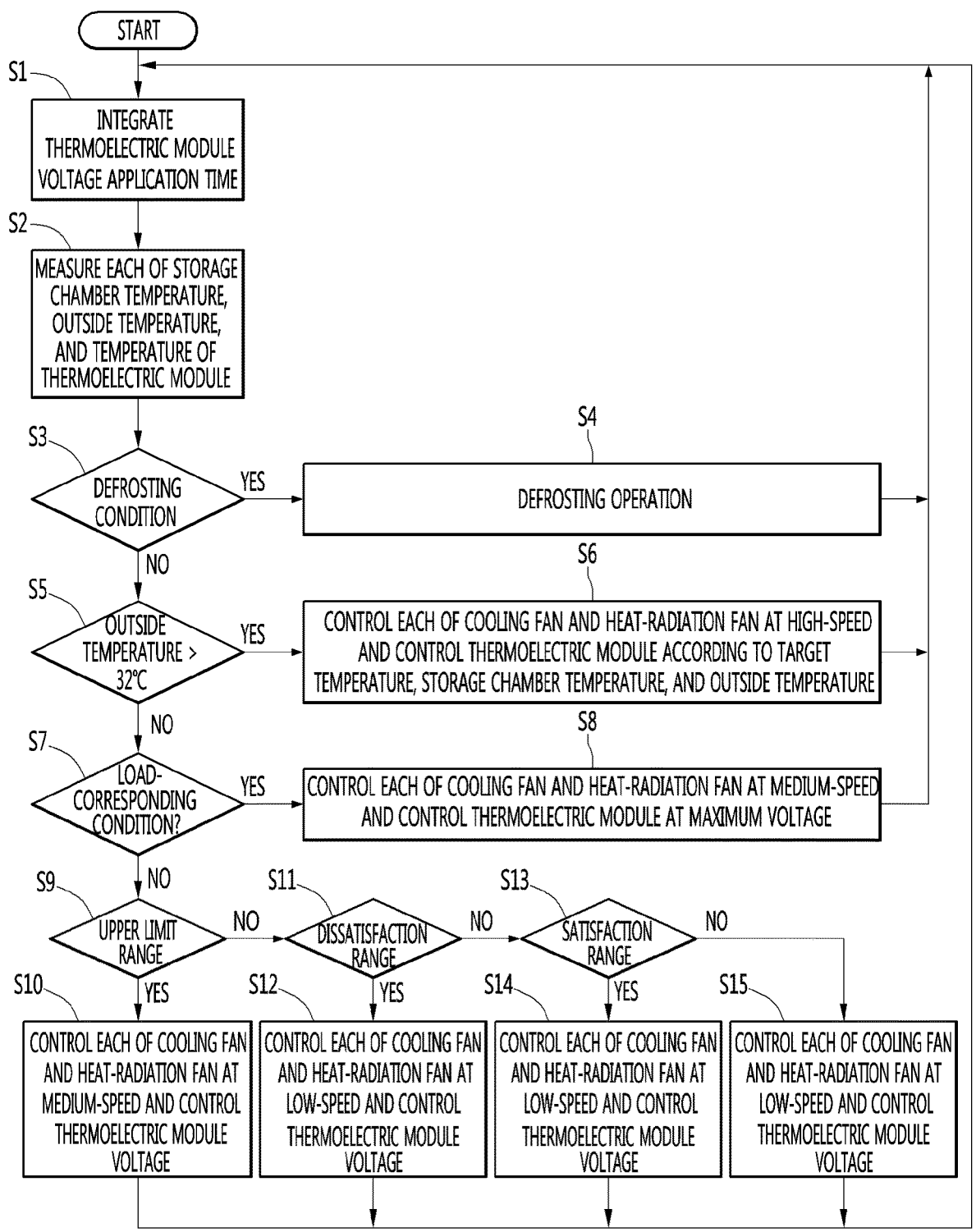
FIG. 6 is a control flowchart illustrating a refrigerator according to an embodiment of the present disclosure.

FIG. 5 is a control block diagram illustrating a refrigerator according to an embodiment of the present disclosure and FIG. 6 is a control flowchart illustrating a refrigerator according to an embodiment of the present disclosure. As shown in the drawings, the refrigerator may include an outside temperature sensor 110 to detect an outside temperature R, and a storage chamber temperature sensor 120 to detect a temperature T of the storage chamber S. The refrigerator may further include a defrost sensor 140 that detects a temperature of the thermoelectric module 3. The refrigerator may further include an input unit (or user interface) 150 to receive a user input, such as an operation/stop command, the desired temperature, or the like.

The outside temperature sensor 110 may be installed in the main body 1 to detect the temperature outside the main body 1. The storage chamber temperature sensor 120 may be installed in the main body 1, particularly adjacent to or within the inner case 11 to detect the temperature T of the storage chamber S. The defrost sensor 140 may be mounted on the cooling sink 32 of the thermoelectric module 3 and may detect the temperature of the cooling sink 32.

Each of the outside temperature sensor 110, the storage chamber temperature sensor 120, and the defrost sensor 140 may detect the temperature value and transmit the detected temperature value to the control unit 9. The control unit 9 may control the refrigerator according to the outside temperature R and the temperature of the storage chamber S. In addition, the control unit 9 may control the refrigerator according to the outside temperature R, the temperature T of the storage chamber S, and the temperature detected by the defrost sensor 140.

The user may input the desired temperature through the input unit 150, and the control unit 9 may control the refrigerator according to the desired temperature input to the input unit 150. In one example, the control unit 9 may apply the voltage within the range of the maximum voltage and the minimum voltage to the thermoelectric module 3. Additionally or alternatively, the control unit 9 may vary the wind speeds of the cooling fan 4 and the heat-radiation fan 5, respectively. Each of the cooling fan 4 and the heat-radiation fan 5 may be controlled at a selected wind speed of a high-speed, a medium-speed, or a low-speed.

The refrigerator may selectively perform a number of operations. The operations may include the defrosting operations S3 and S4, special operations S5 and S6, load-corresponding operations S7 and S8, normal operations S9, S10, S11, S12, S13, S14, and S15, or the like. Hereinafter, a method of operating the refrigerator will be described with reference to FIG. 6.

When operating the refrigerator, the control unit 9 may measure a voltage application time when the voltage is applied to the thermoelectric module 3 using a counter (not illustrated) so as to determine the defrosting operation S3 and S4, and the above-described counted time above may be integrated (S1). The refrigerator may measure the temperature of each of the outside temperature R, the storage chamber temperature T, and the thermoelectric modules 3 (S2).

In the operation method of the refrigerator, after determining whether the current refrigerator is in a defrosting condition in S3, the defrosting operation S4 may be performed when a determined condition of the refrigerator corresponds to the defrosting condition. For example, the control unit 9 may determine whether or not the condition of the refrigerator corresponds to the defrost condition by using the temperature detected by the defrost sensor 140 and the voltage application time integrated into the timer, as factors (S3).

The control unit 9 may perform the defrosting operation S4 to defrost the thermoelectric module 3 when the defrosting condition is determined to be present in the thermoelectric module 3. The defrosting operation S4 may be an operation in which the thermoelectric module 3 is turned off, no voltage may be applied to the thermoelectric module 3, and the cooling fan 4 and the heat-radiation fan 5 may be rotated at a high-speed or a medium-speed, which may be lower than a high-speed, respectively. Hereinafter, the defrosting operation S4 will be described in detail with reference to FIG. 9.

When the condition of the refrigerator does not correspond to the defrosting condition, the control unit 9 determines whether the condition of the refrigerator corresponds to the condition of the special operation, and when the condition of the refrigerator corresponds to the condition of the special operation, the special operation may be performed (S5) (S6). In one example, the control unit 9 may determine whether or not the condition of the refrigerator corresponds to a condition of the special operation based on the outside temperature R (S5).

The control unit 9 may perform the special operation S6 by rotating the cooling fan 4 and the heat-radiation fan 5 at a high-speed when the outside temperature R exceeds the set temperature. The special operation S6 may correspond to the normal operation, described below, for the control of the thermoelectric module 3, and the special operation and the normal operation may differ only in whether or not the cooling fan 4 and the heat-radiation fan 5 are rotated at a high-speed.

In the special operation S6, when the outside temperature R exceeds the set temperature, as in the normal operation, a voltage applied to the thermoelectric module 3 may be changed in accordance with the target temperature N, the temperature of the storage chamber S, and the outside temperature R. Unlike normal operation, the wind speed of the cooling fan 4 and the wind speed of the heat-radiation fan 5 may be a high-speed during the special operation. The special operation S6 may be an operation to increase the wind speed of the cooling fan 4 and the wind speed of the heat-radiation fan 5 to a high-speed, regardless of the desired temperature and the temperature of the storage chamber S.

When the condition of the refrigerator does not correspond to the condition triggering the special operation, the control unit 9 may determine whether or not the condition of the refrigerator corresponds to the load-corresponding operation, and when the condition of the refrigerator corresponds to the condition of the load-corresponding operation, the load-corresponding operation may be performed (S7) and (S8). The control unit 9 may determine whether or not the condition of the refrigerator corresponds to the condition of the load-corresponding operation based on a temperature change in the storage chamber S when the door 2 is opened during the operation of the refrigerator (S7).

When the condition of the refrigerator is determined to correspond to the condition of the load-corresponding operation, the control unit 9 may perform the load-corresponding operation S8 corresponding to this load. The load-corresponding operation S8 may include rotating the cooling fan 4 and the heat-radiation fan 5 at a medium-speed, which may be lower than a high-speed, respectively and applying the maximum voltage to the thermoelectric module 3. The load-corresponding operation S8 will be described with reference to FIG. 10.

On the other hand, an order in the refrigerator of determining whether the defrosting condition (S3) is present, determining whether the condition for performing the special operation (S5) is present, and determining whether the load-corresponding operation is present may differ from the orders described above and shown in the drawings.

The control unit 9 may first perform any one of the determination S3 of the defrosting condition, the determination S5 of the special operation, or the determination S7 of the load-corresponding operation and then may perform sequentially the rest. It should be appreciated that the present application is not limited to the sequence described above. As an example, the control unit 9 may first evaluate the special operation condition, then evaluate the load-corresponding operation when the special operation condition is not present, and then determine whether the defrost condition is present when the load-corresponding operation condition is not present.

On the other hand, at the termination of the defrosting operation, the refrigerator may enter the normal operation described below unless the special operation condition or the load-corresponding operation condition is present. In addition, the refrigerator may enter normal operation at the end of the special operation, unless the condition of the refrigeration corresponds to the condition of the defrosting operation or the condition of the load-corresponding operation. In addition, the refrigerator may enter normal operation at the end of the load-corresponding operation, unless the condition thereof corresponds to the condition of the defrosting operation or the condition of the special operation.

The refrigerator may perform the normal operation S9, S10, S11, S12, S13, S14, and S15 unless the detected condition(s) associated with the refrigerator corresponds to one or more of the defrosting operation condition, the special operation condition, or the load-corresponding operation condition. The control unit 9 may perform the normal operation S9, S10, S11, S12, S13, S14, and S15 by controlling the thermoelectric module 3, the cooling fan 4, and the heat-radiation fan 5 in accordance with the target temperature N, the temperature T of the storage chamber S, and the outside temperature R.

The control unit 9 may control the voltage applied to the thermoelectric module 3 in accordance with the target temperature N, the temperature T of the storage chamber S, and the outside temperature R, as illustrated in Table 1 to be described below. The control unit 9 may change the wind speed of the cooling fan 4 and the wind speed of the heat-radiation fan 5 in accordance with the target temperature N and the temperature T of the storage chamber S, as illustrated in Table 2 described below.

Figure 7:
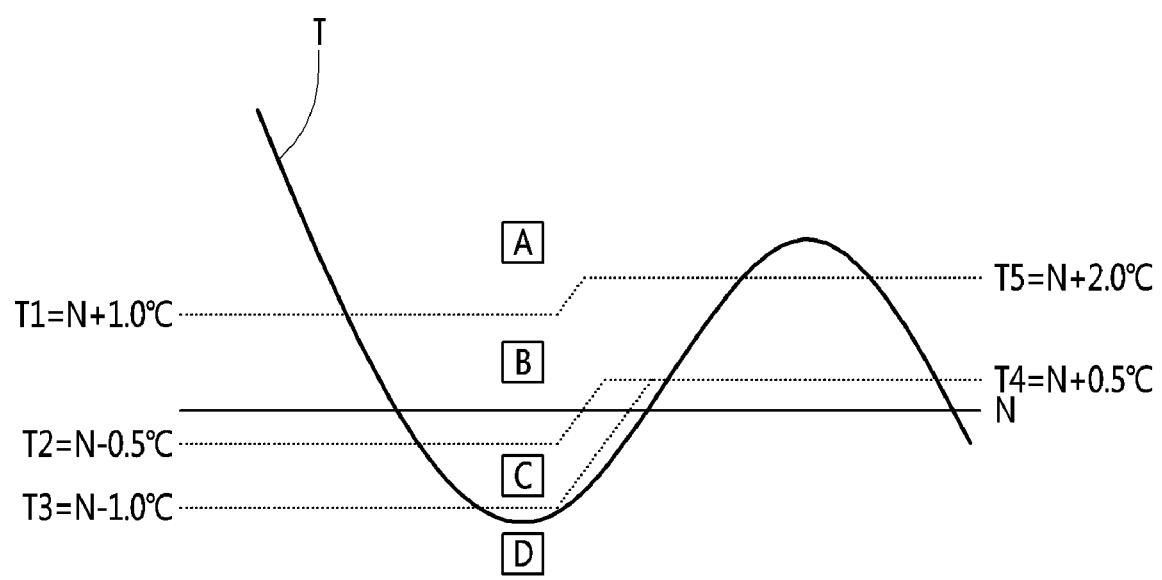
FIG. 7 is a view illustrating a target temperature and a storage chamber temperature range of a refrigerator according to an embodiment of the present disclosure.
Figure 8:
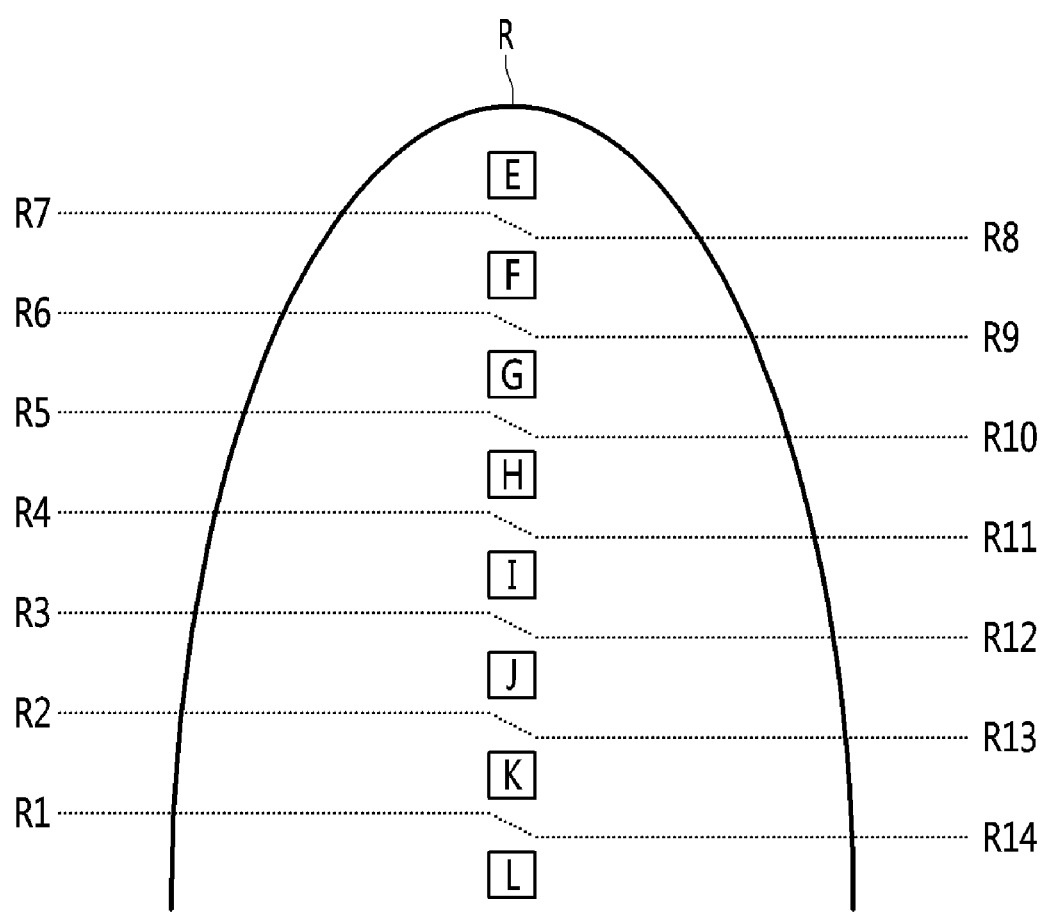
FIG. 8 is a view illustrating an outside temperature range of a refrigerator according to an embodiment of the present disclosure.

The control unit 9 may control based on the temperature of the storage chamber S by dividing the temperature of the storage chamber S into a plurality of storage chamber temperature ranges, as illustrated in FIG. 7 during operation in which the temperature T of the storage chamber S may be used as a factor among the many operations described above (that is, defrost operation, special operation, load-corresponding operation, and normal operation). The control unit 9 may evaluate the outside temperature R by dividing the outside temperature R into a plurality of ranges, as illustrated in FIG. 8, during operation in which the outside temperature R may be used as a factor in the many operations described above.

FIG. 7 illustrates a target temperature and a storage chamber temperature range of a refrigerator according to an embodiment of the present disclosure. With reference to FIG. 7, the temperature T (hereinafter, referred to as "storage chamber temperature T") of the storage chamber S may be increased or decreased according to the load, and the temperature range of the storage chamber S (hereinafter, referred to as "storage chamber temperature range") may be mainly divided into an upper limit range A, a dissatisfaction range B, a satisfaction range C, and a lower limit range D. Hereinafter, a plurality of storage chamber temperature ranges A, B, C and D will be described in detail.

A plurality of storage chamber temperature ranges A, B, C and D may be set on the basis of the target temperature N, and the plurality of storage chamber temperature ranges A, B, C, and D may have respective different entry temperatures and exit temperatures (e.g., high and low temperature range values). Additionally, each of the storage chamber temperature ranges A, B, C, and D may have a temperature difference between the entry temperatures and between exit temperatures.

The target temperature N may be a desired temperature. The control unit 9 may set the target temperature N based on a desired temperature input received through the input unit 150. The control unit 9 may determine when the storage chamber temperature T is currently within one of the storage chamber temperature range A, B, C or D and the pattern of temperature change (that is, whether the storage chamber temperature T is increasing or decreasing). Certain embodiments may include a number of reference temperatures T1, T2, T3, T4, and T5 (e.g., boundary temperatures) to distinguish these four storage chamber temperature ranges A, B, C, and D.

The plurality of reference temperatures T1, T2, T3, T4, and T5 in the refrigerator may include a first reference temperature in the refrigerator (T1: upper limit exit/dissatisfaction entry temperature) at which the storage chamber temperature T gradually lowers to enter the dissatisfaction range B and exit from the upper limit range A, a second reference temperature in the refrigerator (T2: dissatisfaction exit/satisfaction entry temperature) in which the storage chamber temperature T gradually lowers to enter the satisfaction range C and exit from the dissatisfaction range B, and a third reference temperature in the refrigerator (T3: satisfaction exit/lower limit entry temperature) in which the storage chamber temperature T gradually lowers to enter the lower limit range D while exiting from the satisfaction range C.

The first reference temperature T1 in the refrigerator may be set to be higher than the target temperature N. The storage chamber temperature T may be lowered in accordance with the load, and thus, the lowering storage chamber temperature T may reach the first reference temperature T1 in the refrigerator at a temperature higher than the first reference temperature T1 in the refrigerator. In this case, the storage chamber temperature T may be outside of the upper limit range A and may be within the dissatisfaction range B. In one example, the first reference temperature T1 in the refrigerator may be a temperature which may be 1° C. higher than the target temperature N.

The second reference temperature T2 in the refrigerator may be set to be lower than the target temperature N. The storage chamber temperature T may be lowered in accordance with the load and thus the lowering storage chamber temperature T may be lower than the target temperature N and may reach the second reference temperature T2 in the refrigerator at a temperature that is lower than the target temperature. In this case, the storage chamber temperature T may be outside the dissatisfaction range B and may enter the satisfaction range C. In one example, the second reference temperature T2 in the refrigerator may be a temperature which is 0.5° C. lower than the target temperature N.

The third reference temperature T3 in the refrigerator may be set lower than the target temperature N and the second reference temperature T2 in the refrigerator, respectively. The storage chamber temperature T may be lowered in accordance with the load, and thus, the lowering storage chamber temperature T may reach the third reference temperature T3 in the refrigerator at a temperature which may be higher than the third reference temperature T3 in the refrigerator. In this case, the storage chamber temperature T may be outside of the satisfaction range C and within the lower limit range D. In one example, the third reference temperature T3 in the refrigerator may be a temperature which may be 1° C. lower than the target temperature N.

The storage chamber temperature T in the lower limit range D may rise in accordance with the load and the plurality of temperatures may further include a fourth reference temperature in the refrigerator (T4: lower limit exit/dissatisfaction entry temperature) in which the storage chamber temperature T gradually rises to enter the dissatisfaction range B and exits from the lower limit range D. A fifth reference temperature in the refrigerator (T5: dissatisfaction exit/upper limit entry temperature) may correspond to the storage chamber temperature T rising into the upper limit range A while exiting from the dissatisfaction range B.

The fourth reference temperature T4 in the refrigerator may be set to be higher than the target temperature N. The fourth reference temperature T4 in the refrigerator may be set to be lower than the first reference temperature T1 in the refrigerator.

The storage chamber temperature T may rise in accordance with the load, and thus, the rising storage chamber temperature T may rise from a temperature which is lower than the fourth reference temperature T4 in the refrigerator, to the fourth reference temperature T4 in the refrigerator. In this case, the storage chamber temperature T may raise from the lower limit range D and enter the dissatisfaction range B. The fourth reference temperature T4 in the refrigerator may be a temperature which is 0.5° C. higher than the target temperature N.

The fifth reference temperature T5 in the refrigerator may be set higher than the target temperature N and the fourth reference temperature T4 in the refrigerator. The fifth reference temperature T5 in the refrigerator may be set higher than the first reference temperature T1 in the refrigerator. The storage chamber temperature T may rise in accordance with the load, and thus the rising storage chamber temperature T may reach the fifth reference temperature T5 in the refrigerator from a temperature which may be lower than the fifth reference temperature T5 in the refrigerator. In this case, the storage chamber temperature T may exit from the dissatisfaction range B and enter the upper limit range A. The fifth reference temperature T5 in the refrigerator may be a temperature which may be 2° C. higher than the target temperature N.

The control unit 9 may control the thermoelectric module 3, the cooling fan 4, and the heat-radiation fan 5 in accordance with the storage chamber temperature ranges A, B, C, and D, as described above. For example, the control unit 9 may turn off the thermoelectric module 3 when the storage chamber temperature T is in the lower limit range D, and a voltage, which corresponds to the minimum voltage or more, may be applied to the thermoelectric module 3 when the storage chamber temperature T is within the satisfaction range C.

Since the thermoelectric module 3 has a lower performance than the refrigeration cycle device, it may be preferable that the thermoelectric module 3 is not turned off in the satisfaction range C. When the thermoelectric module 3 is in the lower limit range D which is lower than the satisfaction range C, the thermoelectric module 3 may be turned off.

When a plurality of storage chamber temperature ranges are only divided into the upper limit range A, the dissatisfaction range B and the storage chamber temperature T may be in the satisfaction range C, the thermoelectric module 3 may be turned off. However, in this case, as compared with the refrigerator having a refrigeration cycle device, the time when the storage chamber temperature T rises again may be faster, and the thermoelectric module 3 may be frequently turned on and off.

In certain embodiments, the storage chamber temperature ranges further include the lower limit range D that is lower than the satisfaction range C, and the thermoelectric module 3 in the lower limit range D will be at a temperature that is lower than the satisfaction range C. When the thermoelectric module 3 is turned off, the storage chamber S may be sufficiently cooled up to the lower limit range D, which is lower than the satisfaction range C, and the turning-on/off period of the thermoelectric module 3 may be lengthened.

FIG. 8 may be a diagram illustrating an outside temperature range of a refrigerator according to an embodiment of the present disclosure. With reference to FIG. 8, the temperature of the room where the refrigerator may be provided may vary, and the temperature range of the room (hereinafter, referred to as 'outside temperature range') may be divided into a plurality of outside temperature ranges. This plurality of outside temperature ranges may include the uppermost outside temperature range E, the lowermost outside temperature range L, and at least one medium outside temperature range F, G, H, I, J, and K between the uppermost outside temperature range E and the lowermost outside temperature range L.

Hereinafter, a plurality of outside temperature ranges E, F, G, H, J, K, and L will be described. The plurality of outside temperature ranges E, F, G, H, I, J, K, and L may each have different entry temperature and exit temperatures (e.g., cover different temperature ranges). The control unit 9 may determine whether a current outside temperature is within one of the outside temperature range E, F, G, H, I, J, K, and L based on a temperature detected from the outside temperature sensor 120.

Certain embodiments may include a plurality of outside reference temperatures R1 to R14 for distinguishing such a plurality of outside temperature ranges. In one example, the refrigerator may use between a minimum of three outside temperature ranges to a maximum of 40 outside temperature ranges.

A plurality of outside temperature ranges may be different for each of the entry reference temperature for determining entry thereof and the exit reference temperature for determining exit thereof. In the outside temperature range, the entry reference temperature to determine entry thereof and the exit reference temperature to determine exit thereof may be equal to or different from each other. When the entry reference temperature and the exit reference temperature may be different from each other, the entry reference temperature may be set to be 0.5° C. to 1.5° C. higher than the exit reference temperature. For example, the lowermost entry reference temperature for determining the entry of the lowermost outside temperature range L may be set to be 0.5° C. to 1.5° C. higher than the lowermost exit reference temperature for determining the exit of the lowermost outside temperature range L. Since the difference between the entry reference temperature and the exit reference temperature in the other outside temperature ranges may be similar to this example of the lowermost outside temperature range L, a detailed description thereof will be omitted.

In addition, the entry reference temperature of each outside temperature range may be different from the entry reference temperature of the other outside temperature range which may be one step higher or lower by 2° C. to 8° C. The exit reference temperature of each outside temperature range may also have a difference of 4° C. to 6° C. from the exit reference temperature of the other outside temperature range which may be one step higher or lower.

Hereinafter, for the convenience of explanation, the refrigerator is described as using eight outside temperature ranges, but the number of outside temperature ranges is not limited to this specific example. The plurality of outside temperature ranges describe the lowermost outside temperature range as the first outside temperature range, describe the uppermost outside temperature range as the eighth outside temperature range, and describe that there may be the total of six outside temperature ranges E, G, H, I, J, and K between the lowermost outside temperature range L and the uppermost outside temperature range E.

Hereinafter, a plurality of outside reference temperatures R1 to R14 for distinguishing the plurality of outside temperature ranges as described above will be described. The plurality of outside reference temperatures R1 to R14 may include a first outside reference temperature R1 at which the rising outside temperature R exits from the first outside temperature range L, which is the lowermost outside temperature range, and enters the second outside temperature range K, which may be one step higher than the first outside temperature range L, and a second outside reference temperature R2 at which the rising outside temperature R exits from the second outside temperature range K and enters the third outside temperature range J, which may be one step higher than the second outside temperature range K. The second outside reference temperature R2 may be set to be higher than the first outside reference temperature R1 and may be a temperature that is 2° C. to 6° C. higher than the first outside reference temperature R1.

The plurality of outside reference temperatures R1 to R14 may include a third outside reference temperature R3 at which the rising outside temperature R exits the third outside temperature range J and enters the fourth outside temperature range I, which is one step higher than the third outside temperature range J, and a fourth outside reference temperature R4 at which the rising outside temperature R exits the fourth outside temperature range I and enters the fifth outside temperature range H, which is one step higher than the fourth outside temperature range K.

The third outside reference temperature R3 may be set higher than the second outside reference temperature R2, such as a temperature that is 3° C. to 7° C. higher than the second outside reference temperature R2. The fourth outside reference temperature R4 may be set higher than the third outside reference temperature R3, such as being 3° C. to 7° C. higher than the third outside reference temperature R3.

The plurality of outside reference temperatures R1 to R14 may include a fifth outside reference temperature R5 at which the rising outside temperature R exits from the fifth outside temperature range H and enters the sixth outside temperature range G, which may be one step higher than the fifth outside temperature range H, and a sixth outside reference temperature R6 at which the rising outside temperature R exits from the sixth outside temperature range G and enters a seventh outside reference temperature F, which may be one step higher than the sixth outside temperature range G.

The fifth outside reference temperature R5 may be set higher than the fourth outside reference temperature R4 and may be set 4° C. to 8° C. higher than the fourth outside reference temperature R4. The sixth outside reference temperature R6 may be set to be higher than the fifth outside reference temperature R5 and may be set 2° C. to 6° C. higher than the fifth outside reference temperature R5.

The plurality of outside reference temperatures R1 to R14 may include a seventh outside reference temperature R7 at which the rising outside temperature R exits from the seventh outside temperature range F, which is one step lower than an eighth outside temperature range E that is uppermost outside temperature range E, and enters the eighth outside temperature range E, which may be one step higher than the seventh outside temperature range F. The seventh outside reference temperature R7 may be set higher than the sixth outside reference temperature R6 and may be 4° C. to 8° C. higher than the sixth outside reference temperature R6.

The plurality of outside reference temperatures R1 to R14 may further include an eighth outside reference temperature R8 at which the lowering outside temperature R exits from the eighth (uppermost) outside temperature range E and enters the seventh outside temperature range F. The eighth outside reference temperature R8 may be set lower than the seventh outside reference temperature R7 and higher than the sixth outside reference temperature R6. The eighth outside reference temperature R8 may be set 0.5° C. to 1.5° C. lower than the seventh outside reference temperature R7.

The plurality of outside reference temperatures R1 to R14 may include a ninth outer reference temperature R9 at which the lowering outside temperature R exits from the seventh outside temperature range F and enters the sixth outside temperature range G, and a tenth outer reference temperature R10 at which the lowering outside temperature R exits from the sixth outside temperature range G and enters the fifth outside temperature range H. The ninth outside reference temperature R9 may be set lower than the sixth outside reference temperature R6 and the eighth outside reference temperature R8 and may be set higher than the fifth outside reference temperature R5. The ninth outside reference temperature R9 may be a temperature that is set 4° C. to 8° C. lower than the eighth outside reference temperature R8.

The tenth outside reference temperature R10 may be set lower than the fifth outside reference temperature R5 and the ninth outside reference temperature R9, and may be higher than the fourth outside reference temperature R4. The tenth outside reference temperature R10 may be a temperature that is 2° C. to 6° C. lower than the ninth outside reference temperature R9.

The plurality of outside reference temperatures R1 to R14 may include an eleventh outside reference temperature R11 at which the lowering outside temperature R exits from the fifth outside temperature range H and enters the fourth outside temperature range I, and a twelfth outside reference temperature R12 at which the lowering outside temperature R exits from the fourth outside temperature range I and enters the third outside temperature range J.

The eleventh outside reference temperature R11 may be set lower than the fourth outside reference temperature R4 and the tenth outside reference temperature R10, and may be set higher than the third outside reference temperature R3. The eleventh outside reference temperature R11 may be 4° C. to 8° C. lower than the tenth outside reference temperature R8.

The twelfth outside reference temperature R12 may be set lower than the third outside reference temperature R3 and the eleventh outside reference temperature R9 and may be set higher than the second outside reference temperature R2. The twelfth outside reference temperature R12 may be set 3° C. to 7° C. lower than the eleventh outside reference temperature R11.

The plurality of outside reference temperatures R1 to R14 may include a thirteenth outside reference temperature R13 at which the lowering outside temperature R exits from the third outside temperature range J and enters the second outside temperature range K, and a fourteenth outside reference temperature R14 at which the lowering outside temperature R exits from the second outside temperature range K and enters the first outside temperature range L. The thirteenth outside reference temperature R13 may be set to be lower than the second outside reference temperature R2, and the twelfth outside reference temperature R12 and may be set higher than the first outside reference temperature RI. The thirteenth outside reference temperature R13 may be 3° C. to 7° C. lower than the twelfth outside reference temperature R8. The fourteenth outside reference temperature R14 may be set lower than the first outside reference temperature RI and the thirteenth outside reference temperature R13. For example, the fourteenth outside reference temperature R14 may be set 2° C. to 6° C. lower than the thirteenth outside reference temperature R13.

The temperature of the control unit 9 may be determined by a plurality of factors, and the plurality of factors may include a voltage applied to the thermoelectric module 3 and a temperature at a periphery of the control unit 9. The control unit 9 may be heated more as more voltage is applied to the thermoelectric module 3. The control unit 9 may be heated most when a maximum voltage is applied to the thermoelectric module 3. It may be preferable that the refrigerator be configured and controlled such that the control unit 9 is kept at or below an appropriate management temperature even when the maximum voltage is applied to the thermoelectric module 3. The temperature of the control unit 9 when the minimum voltage is applied to the thermoelectric module 3 may be lower than the temperature of the circuit component 94 when the maximum voltage is applied to the thermoelectric module 3.

In addition, the control unit 9 may be heated more as the outside temperature increases or is relatively high (e.g., above a threshold temperature). It may be preferable that the refrigerator be configured and controlled so that the temperature of the control unit 9 be lowered to an appropriate level even when the outside temperature is relatively higher than a normal temperature range, such as when the outside temperature is 38° C. or higher.

It may be possible to apply a relatively high (e.g., the maximum) voltage to the thermoelectric module 3 in order to cope with the load when the refrigerator is operated in a high-temperature condition, such as a case when the peripheral temperature of the refrigerator is 38° C. or more, and in this case, the temperature of the control unit 9 may be excessively increased.

It may be preferable to apply a set voltage lower than the maximum voltage to the thermoelectric module 3 even when the outside temperature is relatively high, such as when the outside temperature is 38° C. or higher.

For example, as described above, when a set voltage below the maximum voltage is applied to the thermoelectric module 3, even if the temperature of the PCB 92 and the circuit component 94 rises to the outside temperature, the temperature of the circuit component 94 itself may remain relatively low, and thus, the overheating of the control unit 9 may be minimized and the reliability of the control unit 9 may be secured.

On the other hand, when the outside temperature is high (e.g., 38° C. or higher) and the maximum voltage may be applied to the thermoelectric module 3, the control unit 9 may overheat to overheat the main body 1, and thus, the temperature of the storage chamber S may also rise. However, when the outside temperature is high and the voltage applied to the thermoelectric module 3 is lowered to a set voltage that is below the maximum voltage, the temperature rise of the storage chamber S due to the overheating of the control unit 9 may be limited.

Hereinafter, the control of the voltage applied to the thermoelectric module will be described. Table 1 shows an example of application voltages of the thermoelectric module according to the target temperature N, the storage chamber temperature range A, B, C and D, and the outside temperature range E, F, G, H, I, J, K, and L of the refrigerator, according to the embodiment of the present disclosure.

TABLE 1

| Target temperature | Outside temperature and Storage chamber temperature | L | K | J | I | H | G | F | E |
|---|---|---|---|---|---|---|---|---|---|
| High-temperature | Upper limit range | Vm-8 | Vm-6 | Vm | Vm | Vm | Vm | Vm | Not Vm |
| | Dissatisfaction range | Vm-12 | Vm-10 | Vm-10 | Vm-10 | Vm-10 | Vm | Vm | Not Vm |
| | Satisfaction range | Vn = Vm-17 | Vn = Vm-17 | Vn = Vm-17 | Vn = Vm-17 | Vm-15 | Vm-6 | Vm-6 | Not Vm |
| Medium-temperature | Upper limit range | Vm-8 | Vm-6 | Vm | Vm | Vm | Vm | Vm | Not Vm |
| | Dissatisfaction range | Vm-12 | Vm-10 | Vm-10 | Vm-8 | Vm-8 | Vm | Vm | Not Vm |
| | Satisfaction range | Vn = Vm-17 | Vn = Vm-17 | Vn = Vm-17 | Vm-15 | Vm-12 | Vm-6 | Vm-6 | Not Vm |
| Low-temperature | Upper limit range | Vm-8 | Vm-6 | Vm | Vm | Vm | Vm | Vm | Not Vm |
| | Dissatisfaction range | Vm-12 | Vm-10 | Vm-8 | Vm-6 | Vm-6 | Vm | Vm | Not Vm |
| | Satisfaction range | Vn = Vm-17 | Vn = Vm-17 | Vn = Vm-17 | Vm-12 | Vm-12 | Vm-6 | Vm-6 | Not Vm |
| Common | Low limit range/ Defrosting operation | O (thermoelectric module off) | | | | | | | |

The target temperature may be divided into a high-temperature, a medium-temperature, and a low-temperature. The high-temperature may be relatively high, such as 7° C. or 8° C.; the low-temperature may be relatively low, such as 3° C. or 4° C.; and the medium-temperature may be between the high-temperature and the low-temperature, such as 5° C. or 6° C.

With reference to Table 1, the control unit 9 may apply the set voltage Not Vm, which differs from the maximum voltage Vm, to the thermoelectric module 3 when the outside temperature R is determined to be in the uppermost outside temperature range E.

Here, the set voltage may be higher than the voltages Vm-8, Vm-12, Vm-17 that are applied when the outside temperature R is in the lowermost outside temperature range L. In one example, the set voltage may be between an average voltage of the maximum voltage Vm and the minimum voltage Vn=Vm-17 and the maximum voltage (Vm).

When the set voltage is lower than the average voltage, the temperature rise rate of the storage chamber temperature T may be excessively large, and the set voltage may be preferably set to an appropriate voltage at which the temperature of the storage chamber temperature T does not rise rapidly. To this end, when the maximum voltage Vm applied to the thermoelectric module 3 is 18V to 26V and the minimum voltage Vn is 2V to 6V, the set voltage may be Vm-4 to Vm-8, or 4V to 8V lower than the maximum voltage Vm.

On the other hand, the voltages Vm and Vm-6 which are applied when the outside temperature R is in a temperature range F, which is one step lower than the uppermost outside temperature range E, may be higher than the voltage Vm-8, Vm-12, Vm-17 which are applied when the outside temperature R is in the temperature range (F), which is in the lowermost temperature range L.

With reference to Table 1, when the outside temperature R is one step lower than the uppermost outside temperature range E, the lowermost voltage which is applied is Vm-6 when the storage chamber temperature T is in the satisfaction range C, when the outside temperature R is in a lowermost outside temperature range L, the uppermost voltage which is applied is Vm-8 when the storage chamber temperature T is in the upper limit range A, and the lowermost voltage Vm-6 which is applied when the outside temperature R is in the range F which is one step lower than the uppermost outside temperature range E may be higher than the uppermost voltage Vm-8 when the outside temperature R is in lowermost outside temperature range L.

The voltage applied to the thermoelectric module 3 when the outside temperature R is high may be higher than the voltage applied to the thermoelectric module 3 when the outside temperature R is low and when the outside temperature R is in the uppermost outside temperature range E. So as to protect the control unit 9, the uppermost voltage Vm may not be applied to the thermoelectric module 3 but the set voltage Vm-4 to Vm-8, which is lower than the uppermost voltage Vm, may be applied to thermoelectric module 3.

Here, the set voltage may be set to be higher than the voltages Vm-8, Vm-12, Vm-17 applied when the outside temperature R is in the lowermost outside temperature range L. The set voltage may be set between an average voltage of the maximum voltage Vm and the minimum voltage Vn=Vm-17 and the maximum voltage Vm.

With reference to Table 1, when the outside temperature R is in the uppermost outside temperature range E or in the outside temperature ranges F and G that are one to two stages lower than the uppermost outside temperature range E, the control unit 9 may apply the voltage Vm-6 and Vm, which may be equal to or lower than the maximum voltage Vm and higher than the average voltage Vm-8.5 of the maximum voltage Vm and the minimum voltage Vn=Vm-17 to the thermoelectric module 3.

With reference to Table 1, the control unit 9 may not apply the voltage to the thermoelectric module 3 (voltage=0) when the storage chamber temperature T is in the lower limit range D. Thus, the control unit 9 may turn off the thermoelectric module 3 when the storage chamber temperature T is in the low limit range D, regardless of whether or not the target temperature N is one of a high-temperature, a medium-temperature, or a low-temperature and the outside temperature is in ranges E to L.

With reference to Table 1, a voltage applied when the storage chamber temperature T is in the satisfaction range C higher than the lower limit range D may be lower than a voltage when the storage chamber temperature T is in the dissatisfaction range B higher than the satisfaction range C.

When the target temperature N other than the storage chamber temperature T and the outside temperature range E to L are in a same condition, a voltage when the storage chamber temperature T is in the satisfaction range C may be lower than the voltage when the storage chamber temperature T is in the dissatisfaction range B. For example, when the target temperature is "high" and the outside temperature range is in the first outside temperature range, the voltage Vn=Vm-17 when the storage chamber temperature T is in the satisfaction range C may be lower than the voltage Vm-12 when the storage chamber temperature T is in the dissatisfaction range B. In another example, when the target temperature is a medium-temperature and the outside temperature range is in the third outside temperature range J, the voltage Vm-17 that is applied when the storage chamber temperature T is in the satisfaction range C may be lower than the voltage Vm-10 that is applied when the storage chamber temperature T is in the dissatisfaction range B.

As another example, when the target temperature is low and the outside temperature range is in the fourth outside temperature range I, the voltage Vm-12 when the storage chamber temperature T is in the satisfaction range C may be may be lower than the voltage Vm-6 when the storage chamber temperature T may be in the dissatisfaction range B.

With reference to Table 1, the voltage when the storage chamber temperature T is in the upper limit range A which is higher than the dissatisfaction range B may be higher than or equal to the voltage when the storage chamber temperature T is in the dissatisfaction range B.

When the target temperature N other than the storage chamber temperature T and the outside temperature range E to L correspond to a same condition, the voltage which is applied when the storage chamber temperature T is in the upper limit range A may be higher than or equal to the voltage when the storage chamber temperature T is in the dissatisfaction range B.

For example, when the target temperature is high and the outside temperature range is in the first outside temperature range L, the voltage Vm-8 which is applied when the storage chamber temperature T is in the upper limit range A may be higher than the voltage Vm-12 which is applied when the storage chamber temperature T is in the dissatisfaction range B.

As another example, when the target temperature is a medium-temperature and the outside temperature range is in the third outside temperature range J, the voltage Vm which is applied when the storage chamber temperature T is in the upper limit range A may be higher than the voltage Vm-10 which is applied when the storage chamber temperature T is in the dissatisfaction range B.

In another example, when the target temperature is low and the outside temperature range is in the sixth outside temperature range G, the voltage Vm which is applied when the storage chamber temperature T is in the upper limit range C may be equal to the voltage Vm which is applied when the storage chamber temperature T is in the dissatisfaction range B.

Table 2 illustrates an example of a priority control procedure for the cooling fan and the heat-radiation fan according to an embodiment of the present disclosure.

TABLE 2

| Priority | Control condition | Cooling fan control and heat-radiation fan control |
|---|---|---|
| First rank | Door open | Cooling fan and heat-radiation fan Off |
| Second rank | Defrosting process | Cooling fan and heat-radiation fan Medium-speed |
| Third rank | Defrosting pre-cooling process | |
| Fourth rank | Initial power input | |
| Fifth rank | Outside temperature>32° C. | Cooling fan and heat-radiation fan High-speed |
| Sixth rank | Load-corresponding operation | Cooling fan and heat-radiation fan Medium-speed |
| Seventh rank | Change of outside temperature range | |
| Eighth rank | In a case where storage chamber temperature may be in upper limit range | |
| Ninth rank | In a case where storage chamber temperature may be in dissatisfaction range/satisfaction range/lower limit range | Cooling fan and heat-radiation fan Low-speed |

As described below, the control unit 9 may manage (e.g., control a voltage applied to) the cooling fan 4 and the heat-radiation fan 5 based on the priority control procedure illustrated in Table 2. For example, the control unit 9 may control the heat-radiation fan 5 to operate at substantially a same wind speed as that of the cooling fan 4 when the heat-radiation fan 5 is controlled. The control unit 9 may rotate the cooling fan 4 and the heat-radiation fan 5 together at a relatively high-speed, rotate the cooling fan 4 and the heat-radiation fan 5 together at a medium-speed, or rotate the cooling fan 4 and the heat-radiation fan 5 together at a low-speed.

As illustrated in Table 2, the control unit 9 may control the cooling fan 4 and the heat-radiation fan 4 by assigning priorities based on whether or not the door 2 may be opened, the defrosting process, the defrosting pre-cooling process, whether or not the initial power input may be performed, whether or not the outside temperature R exceeds the set temperature (for example, 32° C.), whether or not the load-corresponding operation may be performed, whether or not the outside temperature range may be changed, the upper limit range of the storage chamber temperature, and the dissatisfaction range/satisfaction range/lower limit range of the storage chamber temperature.

The control unit 9 may turn off the cooling fan 4 and the heat-radiation fan 5 or perform a high-speed control thereof, a medium-speed control thereof, or a low-speed control thereof on the basis of the priorities illustrated in Table 2. Even when the operation condition of the refrigerator is in a lower-priority condition and the operation condition of the refrigerator satisfies a higher-priority condition, the control unit 9 may determine off/a high-speed/a medium-speed/a low-speed of the cooling fan 4 and the heat-radiation fan 5 on the basis of the higher-priority condition.

For the sake of convenience, as described above, the priority may be mainly divided into a higher-priority and a lower-priority. The control unit 9 may control the cooling fan 4 and the heat-radiation fan 5 by assigning a high priority (first rank to fourth rank) to whether or not the door 2 may be opened, the defrosting process, the defrosting pre-cooling process, whether or not initial power may be input.

The control unit 9 may control the cooling fan 4 and the heat-radiation fan 5 by assigning the lower-priorities (fifth rank to ninth rank) to whether or not the outside temperature R exceeds the set temperature, load-corresponding operation, whether or not the outside temperature range may be changed, the upper limit range of the storage chamber temperature, dissatisfaction range/satisfaction range/lower limit range. Even if the operating condition of the refrigerator corresponds to the higher-priorities (fifth rank to ninth rank), when the operating condition of the refrigerator corresponds to the higher-priorities (first rank to fourth rank), the control unit 9 may control the cooling fan 4 and the heat-radiation fan 5 according to the higher-priorities (first rank to fourth rank).

In a case where the operation conditions of the refrigerator correspond to the higher-priorities (first rank to fourth rank), the control unit 9 may control the cooling fan 4 and the heat radiation fan 5 according to each priority of the higher-priorities (first rank to fourth rank) regardless of the lower-priorities (fifth rank to ninth rank). The control unit 9 may control the cooling fan 4 and the heat-radiation fan 5 on the basis of the order of the uppermost priority among the higher-priorities (first rank to fourth rank).

In a case where the refrigerator does not correspond to any of the higher-priorities (first rank to fourth rank), the control unit 9 may control the cooling fan 4 and the heat-radiation fan 5 on the basis of the order of the uppermost-priority among the lower-priorities (fifth rank to ninth rank). Hereinafter, first, the higher-priorities (first rank to fourth rank) will be described.

The control unit 9 may assign the uppermost priority (first rank) to whether or not the door 2 is open and control the cooling fan 4 accordingly. The control unit 9 may turn off the cooling fan 4 when the door 2 may be opened. The control unit 9 may turn off the heat-radiation fan 5 when the cooling fan 4 is turned off.

The control unit 9 may detect whether the door 2 may be opened or closed by a door detection sensor or a door switch (not illustrated) provided in the main body 1 or the door 2. The door detection sensor or the door switch may output a signal to the control unit 9 when the door 2 is opened, and the control unit 9 may detect whether or not the door 2 is open or closed and whether or not the door 2 is sealed by this signal.

When the door 2 may be closed, the control unit 9 may detect closing of the door, and the control unit 9 may control the cooling fan 4 and the heat-radiation fan 5 according to the second rank to ninth rank.

The control unit 9 may control the cooling fan 4 and the heat-radiation fan 5 at a high-speed or a medium-speed during the defrosting process, the defrosting pre-cooling process, or during operation after initial power input when the door 2 is closed. The defrosting process may be a process of removing the frost of the thermoelectric module 3. In the defrosting process, no voltage may be applied to the thermoelectric module 3 to prevent further cooling and frost accumulation, and the cooling fan 4 and the heat-radiation fan 5 may be rotated to provide an air flow toward the thermoelectric module 3.

The defrosting pre-cooling process may be a process performed before the defrosting process, and may include pre-cooling the storage chamber before the defrosting process. In the defrosting pre-cooling process, a voltage may be applied to the thermoelectric module 3 to cool the thermoelectric module 3, and the cooling fan 4 and the heat-radiation fan 5 may be rotated to provide an air flow to heat exchange with the cooled thermoelectric module 3 such that the interior of the refrigerator is cooled.

In the priorities of the defrosting process, the defrosting pre-cooling process, and the operation after the initial power input, the cooling fan 4 and the heat-radiation fan 5 may be controlled at the same wind speed, and the priorities may be a substantially same priority.

The control unit 9 may control the cooling fan 4 and the heat-radiation fan 5 to operate at one or more speeds that differ from the speed associated with the initial power input at the time of the defrosting process and the defrosting pre-cooling process. For example, the control unit 9 may control the cooling fan 4 and the heat-radiation fan 5 at a medium-speed in the defrosting process or the defrosting pre-cooling process in a state when the door 2 is closed. On the other hand, the control unit 9 may control the cooling fan 4 and the heat-radiation fan 5 at a high-speed in the operation after the initial power input when the door 2 is closed.

At the time of the initial power input, the temperature of the storage chamber S may be same with the outside temperature. In this case, so as to cool quickly and uniformly the entire storage chamber S, the control unit 9 may rotate the cooling fan 4 and the heat-radiation fan 5 at a high-speed. The control unit 9 may control the cooling fan 4 and the heat-radiation fan 5 to operate at a high-speed until the storage chamber temperature T reaches the dissatisfaction range B lower than the upper limit range A. When the storage chamber temperature T enters the dissatisfaction range B, the cooling fan 4 and the heat-radiation fan 5 may be slowed to rotate at a medium-speed.

Hereinafter, the lower-priorities (fifth rank to eighth rank) will be described as follows. The control unit 9 may rotate the cooling fan 4 and the heat-radiation fan 5 at a high-speed when the outside temperature exceeds the set temperature. The control unit 9 may rotate the cooling fan 4 and the heat-radiation fan 5 at a high-speed when the outside temperature exceeds the set temperature, when the defrosting operation is not performed and the initial power input is not performed.

Here, the set temperature may be set to a temperature in a relatively a high-temperature range E and/or F among a plurality of outside temperature ranges. In a case where the outside temperature exceeds the set temperature, the load on the storage chamber S may be large, and the cooling fan 4 and the heat-radiation fan 5 may be rotated at a high-speed so that the storage chamber S may be cooled more quickly by the cooling sink 32 of the thermoelectric module 3.

The set temperature may be set to a relatively a high-temperature such as 31° C. to 33° C. The set temperature may be 32° C. and the control unit 9 may determine whether or not the cooling fan 4 and the heat-radiation fan 5 may operate at a high-speed based on the set temperature.

The set temperature may be set to the temperature within the outer temperature range F, G, H, I, J, and K between the uppermost outer temperature range E and the lowermost temperature range L, among the plurality of outer temperature ranges. The set temperature may be set to a temperature within the outside temperature range F or G rather than the lowermost temperature range L, which may be one or two steps lower than the uppermost outside temperature range E.

In a case where the temperature of the room in which the refrigerator may be provided may be as high as 32° C., the load of the refrigerator may rise quickly, and in a case where the temperature around the refrigerator may be high, when the cooling fan 4 and the heat-radiation fan 5 rotate at a high-speed, the corruption of foods or other stored items may be minimized.

Since the thermoelectric module 3 may be less efficient than the refrigeration cycle device, performance of the thermoelectric module 3 may be relatively lower than that of the refrigeration cycle device for the same power consumption. Even if the outside temperature exceeds the set temperature, when the cooling fan 4 and the heat-radiation fan 5 are rotated at a high-speed, the cooling air cooled by the thermoelectric module 3 may rapidly flow to the storage chamber S and the temperature variations in the storage chamber S may be minimized and corruption of foods and the like may be minimized.

On the other hand, when the outside temperature is equal to or lower than the set temperature, the control unit 9 may control the cooling fan 4 and the heat-radiation fan 5 according to the next priority (sixth rank to eighth rank or ninth rank). When the outside temperature is equal to or lower than the set temperature, the control unit 9 may determine whether or not the load-corresponding operation may be performed, whether or not the outside temperature range E, F, G, H, I, J, and K may be changed, or whether or not the storage chamber temperature T is in the upper limit range A.

When the outside temperature is equal to or lower than the set temperature and the load-corresponding operation may be performed, the outside temperature ranges E, F, G, H, I, J, and K may be changed, or the storage chamber temperature T may be in the upper limit range A, the control unit 9 may rotate the cooling fan 4 and the heat-radiation fan 5 at a medium-speed lower than a high-speed.

When the defrosting operation is not performed, the initial power input may be not performed, and the outside temperature may be equal to or lower than the set temperature, in a case of the condition of the load-corresponding operation, the control unit 9 may rotate the cooling fan 4 and the heat-radiation fan 5 at a medium-speed. On the other hand, when the defrosting operation is not performed, the initial power input is not performed, and the outside temperature is equal to or lower than the set temperature, the outside temperature range E, F, G, H, I, J, and K may be changed, and the control unit 9 may rotate the cooling fan 4 and the heat-radiation fan 5 at a medium-speed.

When the control unit 9 rotates the cooling fan 4 and the heat-radiation fan 5 at a medium-speed according to the outside temperature range change as described above, the control unit 9 may rotates the cooling fan 4 and the heat-radiation fan 5 at a medium-speed until the storage chamber temperature T reaches the satisfaction range C. When the storage chamber temperature T reaches the satisfaction range B during the rotation of the cooling fan 4 and the heat-radiation fan 5 at a medium-speed according to the change of the outside temperature range, the control unit 9 may rotate the cooling fan 4 and the heat-radiation fan 5 at a medium-speed or a low-speed according to whether or not the storage chamber temperature is in the upper limit range A, the dissatisfaction range B, the satisfaction range C, or the lower limit range D.

On the other hand, when the defrosting operation is not performed, the initial power input is not performed, the outside temperature is equal to or lower than the set temperature, and the storage chamber temperature T is in the upper limit range A, the control unit 9 may rotate the cooling fan 4 and the heat-radiation fan 5 at a medium-speed.

Here, the condition of the load-corresponding operation, the change condition of the outside temperature ranges E, F, G, H, I, J, and K, and the condition that the storage chamber temperature T may be in the upper limit range A may be substantially the same priority, since the cooling fan 4 and the heat-radiation fan 5 may be controlled at the same wind speed in these conditions.

Even in a case that the load-corresponding operation is performed, the outside temperature range E, F, G, H, I, J, and K is changed, or the storage chamber temperature T is in the upper limit range A, and when the outside temperature R exceeds the set temperature (fifth rank), the control unit 9 may rotate the cooling fan 4 and the heat-radiation fan 5 at a high-speed.

On the other hand, when the outside temperature is equal to or lower than the set temperature, the outside temperature range E, F, G, H, I, J, and K is not changed, and the storage chamber temperature T is less than the upper limit range A, the control unit 9 may rotate the cooling fan 4 and the heat-radiation fan 5 at a low-speed that may be lower than a medium-speed.

In a condition in which the defrosting operation is not performed, the initial power input is not performed, the outside temperature is equal to or lower than the set temperature, the load-corresponding operation is not performed, and the outside temperature range E, F, G, H, I, J, and K is not changed, the control unit 9 may determine whether or not the storage chamber temperature T may be in any one of the dissatisfaction range, the satisfaction range, or the lower limit range.

In a condition in which the defrosting operation is not performed, the initial power input is not performed, the outside temperature is equal to or lower than the set temperature, the load-corresponding operation is not performed, the outside temperature range E, F, G, H, I, J, and K is not changed, and the storage chamber temperature T is in any one of the dissatisfaction range, the satisfaction range, or the lower limit range, the control unit 9 may rotate the cooling fan 4 and the heat-radiation fan 5 at a low-speed.

On the other hand, in certain embodiments, whether or not the cooling fan 4 and the heat-radiation fan 5 are rotated at a low-speed may be determined regardless of the condition of the load-corresponding operation and whether or not the outside temperature range E, F, G, H, I, J, or K is changed. In one situation when the defrosting operation is not performed, the initial power input is not performed, the outside temperature is equal to or lower than the set temperature, and the storage chamber temperature T is in any one of the dissatisfaction range, the satisfaction range, or the lower limit range, the control unit 9 may rotate the fan 4 and the heat-radiation fan 5 at a low-speed.

Hereinafter, the normal operation of the refrigerator will be described with reference to FIG. 6. When the defrosting operation S4, the special operation S6 and the load-corresponding operation S8 are not performed, and when the storage chamber temperature T is in the upper limit range A, the control unit 9 may apply the voltage (for example, Vm-8, Vm-6, and Vm) that is determined, as illustrated in Table 1, according to the target temperature N and the outside temperature ranges E to L to the thermoelectric module 3. In addition, the control unit 9 may rotate the cooling fan 4 and the heat-radiation fan 5 at a medium-speed, as illustrated in Table 2 (S9) (S10).

When the defrosting operation S4, the special operation S6, and the load-corresponding operation S8 are not performed, and the storage chamber temperature T is in the dissatisfaction range B, the control unit 9 may apply the voltage (for example, Vm-12, Vm-10, Vm-8, Vm-6, and Vm) determined according to the target temperature N and the outside temperature ranges E to L to the thermoelectric module 3, as illustrated in Table 1. In addition, the control unit 9 may rotate the cooling fan 4 and the heat-radiation fan 5 at a low-speed, as illustrated in Table 2 (S11) (S12).

The normal operation when the storage chamber temperature T is in the dissatisfaction range B may correspond to an operation in which the cooling fan 4 and the heat-radiation fan 5 may be rotated at a low-speed while the voltage corresponding to the current load is applied to the thermoelectric module 3. In this operational mode, the noise of the refrigerator may be relatively smaller than a case when the cooling fan 4 and the heat-radiation fan 5 are rotated at high-speeds.

When none of the defrosting operation S4, the special operation S6, and the load-corresponding operation S8 is being performed, and the storage chamber temperature T is in the satisfaction range C, the control unit 9 may apply the voltage (for example, Vm-17, Vm-15, Vm-12, and Vm-6) determined according to the target temperature N and the outside temperature range E to L to the thermoelectric module 3, as illustrated in Table 1. In addition, the control unit 9 may rotate the cooling fan 4 and the heat-radiation fan 5 at low-speeds, as illustrated in Table 2 (S13) (S14).

The normal operation when the storage chamber temperature T is in the satisfaction range C may include the cooling fan 4 and the heat-radiation fan 5 being rotated at low-speeds while the voltage corresponding to the current load may be applied to the thermoelectric module 3. The noise of the refrigerator may also be relatively small in the normal operation when the storage chamber temperature T is in the dissatisfaction range B.

When the defrosting operation S4, the special operation S6, and the load-corresponding operation S8 are not being performed, and the storage chamber temperature T is not in any one of the upper limit range A, the dissatisfaction range B, or the satisfaction range C, the control unit 9 may implement the normal operation in which the storage chamber temperature T is in the lower limit range D, and as illustrated in Table 1, the control unit 9 may turn off the thermoelectric module 3. Additionally, the control unit 9 may rotate the cooling fan 4 and the heat-radiation fan 5 at a low-speed, as illustrated in Table 2 (S13) (S15).

For example, the normal operation when the storage chamber temperature T is in the lower limit range D may be an operation for blocking a voltage applied to the thermoelectric module 3 to minimize power consumption. In this case, the normal operation may be a kind of a natural defrosting operation which defrosts the thermoelectric module 3 like a natural defrosting while the cooling fan 4 and the heat-radiation fan 5 are being rotated at a low-speed to minimize the temperature deviations in the storage chamber S.

Figure 9:
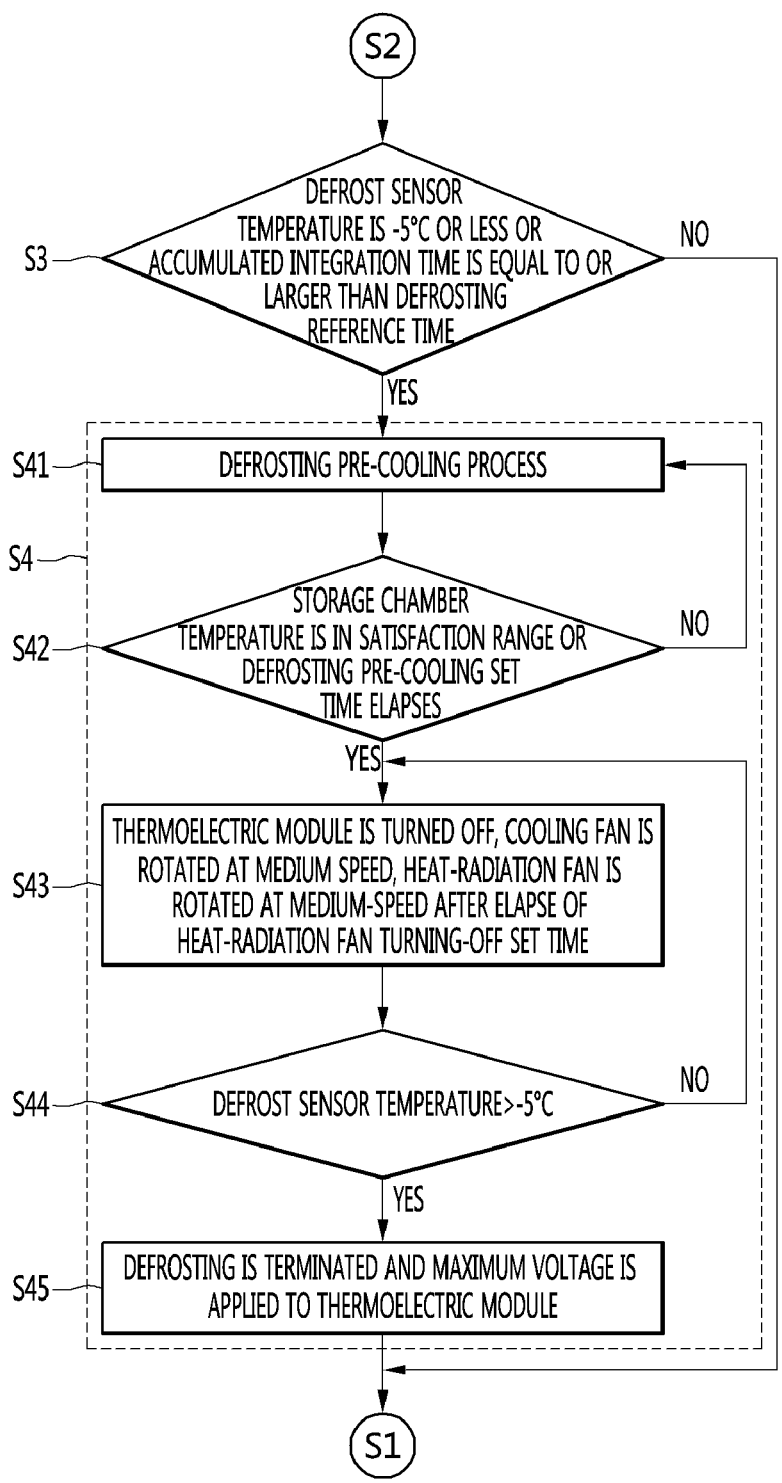
FIG. 9 is a flowchart illustrating the defrosting operation illustrated in FIG. 6.

FIG. 9 is a flowchart of the defrosting operation illustrated in FIG. 6. The defrosting operation of the operation methods of the refrigerator may determine whether or not the operation is the defrosting condition using the temperature detected by a defrost sensor 140 or the integration time when the voltage is applied to the thermoelectric module as factors (S3).

The control unit 9 may determine whether or not the temperature detected by the defrost sensor 140 is lower than or equal to the defrosting set temperature (for example, −5° C.). In addition, the control unit 9 may determine whether or not the integration time when the voltage is applied to the thermoelectric module 3 is longer than or equal to the predetermined defrost reference time. Here, the factor of the integration time may include a factor of the general integration time and a factor of the variable integration time reflecting whether or not the door 2 is opened.

The condition of the defrost reference time may include a general reference time compared with the general integration time and a change reference time compared with the change integration time. An example of a general reference time may be a fixed time of 60 minutes.

An example of the change reference time may be a time that is subtracted by 7 minutes for each opening of the door from 540 minutes. In this example, when the door is opened 10 times for 540 minutes, the change reference time may be 470 hours. When the door may be opened 30 times for 540 minutes, the change reference time may be 330 minutes.

The control unit 9 may determine that the temperature detected by the defrost sensor 140 may be the first condition, which may be lower than or equal to the defrosting set temperature (for example, −5° C.) and currently the refrigerator may be in the defrosting condition. The control unit 9 may determine that the refrigerator is in the defrost condition when the integration time when the voltage is applied to the thermoelectric module 3 corresponds to a second condition which is greater than or equal to the general reference time and longer than or equal to the change reference time.

The control unit 9 may determine that the defrosting operation is being implemented when any one of the first condition or the second condition is satisfied. When the control unit 9 determines that the defrosting operation is performed, the defrosting pre-cooling processes S41 and S42 may be performed first, and the defrosting processes S43 and S44 may be performed when the defrosting freezing processes S41 and S42 are completed. Here, the defrosting operation may be an operation including both the defrosting pre-cooling processes S41 and S42 and the defrosting processes S43 and S44.

The control unit 9 may significantly reduce or not apply the voltage to the thermoelectric module 3 during the defrosting operation. The control unit 9 may turn off the thermoelectric module 3 during the defrosting operation, rotate the cooling fan 4, keep turning-off the heat-radiation fan 5 from at the time of turning-off of the thermoelectric module 3 during the heat-radiation fan turning-off set time (for example, three minutes or five minutes), and then rotate the heat-radiation fan 5 when the heat-radiation fan turning-off set time elapses. The control unit 9 may control the cooling fan 4 and the heat-radiation fan 5 at medium-speeds such that the cooling fan 4 and the heat-radiation fan 5 are rotated during the defrosting operation.

Here, the step of "during the defrosting operation" may be include "during the defrosting pre-cooling processes" S41 and S42, and when the defrosting pre-cooling processes S41 and S42 are completed and the frosting processes S43 and S44 are started, the control unit 9 may turn off the thermoelectric module 3, rotate the cooling fan 4 at a medium-speed, keep turning-off of the heat-radiation fan 5 during the heat-radiation fan turning-off set time, and rotate the heat-radiation fan 5 at a medium-speed when the heat-radiation fan turning-off set time elapses.

The defrosting pre-cooling process S41 and S42 may be processes of cooling the storage chamber S to the satisfaction range B before the defrosting processes S43 and S44. The control unit 9 may continue performing an existing operation without immediately starting the defrosting of the thermoelectric module 3 even if it is determined that the defrosting operation may be performed when the condition of the defrosting operation is determined.

For example, when the defrosting condition is determined when the refrigerator is in a normal operation in the dissatisfaction range C, the control unit 9 may continue to apply voltage in the dissatisfaction range to the thermoelectric module 3, and the cooling fan 4 and the heat-radiation fan 5 may be kept at a wind speed in the dissatisfaction range.

The defrosting pre-cooling processes S41 and S42 may be completed when the defrosting pre-cooling completion condition is satisfied. The defrosting pre-cooling completion condition may be a first condition in which the storage chamber temperature T is in the satisfaction range during the defrosting pre-cooling process S2 and a second condition in which the defrosting pre-cooling set time (for example, 30 minutes) elapses after the defrosting pre-cooling processes S41 and S42 have started (S42). The defrosting pre-cooling processes S41 and S42 may be completed when any one of the first condition and the second condition is satisfied.

The control unit 9 may immediately complete the defrosting pre-cooling process regardless of the defrosting pre-cooling set time when the storage chamber temperature T is determined to be in the satisfaction range during the defrosting pre-cooling process S2.

When the defrosting pre-cooling set time (for example, 30 minutes) elapses after the defrosting pre-cooling process started and regardless of whether or not the storage chamber temperature T has reached the satisfaction range, the control unit 9 may complete the defrosting pre-cooling processes S41 and S42.

The control unit 9 may start the defrosting process S43 when the defrosting pre-cooling completion condition is satisfied during the defrosting operation and may turn off the thermoelectric module 3 at the time of start of the defrosting process S43 and may rotate the cooling fan 4 at a medium-speed. The control unit 9 may continue to turn-off of the heat-radiation fan 5 during the heat-radiation fan turning-off set time at the start of the defrosting process S43 and may then rotate the heat-radiation fan 5 at a medium-speed when the heat-radiation fan turning off set time elapses.

When the voltage applied to the thermoelectric module 3 is blocked and the cooling fan 4 is rotated, the air in the storage chamber S may circulate through the cooling sink 32 of the thermoelectric module 3 and the storage chamber S and thus may naturally defrost the cooling sink 32 by the air in the storage chamber S. The heat-radiation fan 5 may be turned off during the heat-radiation fan turning-off set time while the cooling fan 4 is rotated without applying a voltage to the thermoelectric module 3. In this case, the heat conducted from the heat sink 33 of the thermoelectric module 3 may be transferred to the cooling sink 32 of the thermoelectric module 3, and the temperature of the cooling sink 32 may rapidly rise by the heat of the air flowing from the storage chamber S and the heat conducted from the heat sink 33.

The temperature of the cooling sink 32 may rise quickly during the heat-radiation fan turning-off set time and the frost formed on the cooling sink 32 may be more quickly defrosted by the temperature rise of the cooling sink 32. When the heat-radiation fan turning-off set time elapses, the control unit 9 may control the heat-radiation fan 5 to rotate at a substantially same wind speed as that of the cooling fan 4 so that the thermoelectric module 3 may be stably driven even after the defrosting operation is terminated and may control the heat-radiation fan 5 at medium-speeds, similar to the cooling fan 4.

When the heat-radiation fan turning-off set time elapses, the control unit 9 may keep the wind speed of the cooling fan 4 and the wind speed of the heat-radiation fan 5 at medium-speeds while continuing to turn-off the thermoelectric module 3 continuously until the defrosting completion condition is satisfied. The defrosting operation of the refrigerator may determine the defrosting termination to the temperature detected by the defrost sensor 140.

The control unit 9 may determine whether or not the temperature detected by the defrost sensor 140 exceeds the defrosting completion temperature (for example, 5° C.). Here, the defrosting completion temperature may be a temperature higher than the defrost setting temperature.

The control unit 9 may terminate the defrosting operation when the temperature sensed by the defrost sensor 140 exceeds the defrosting completion temperature (for example, 5° C.) (S44). The control unit 9 may apply the maximum voltage to the thermoelectric module 3 at the time of defrosting termination (S45).

The control unit 9 may apply the maximum voltage to the thermoelectric module 3 at the time of defrosting termination and may change the voltage being applied to the thermoelectric module 3 at the following special operation S6, the load-corresponding operation S8, and the normal operation S9, S10, S11, S12, S13, S14, and S15.

The control unit 9 generally does not apply the maximum voltage to the thermoelectric module 3 at the time of defrosting termination but may also apply the voltage determined at the following special operation S6, the load-corresponding operation S8, and the normal operation S9, S10, S11, S12, S13, S14, and S15 to the thermoelectric module 3.

Figure 10:
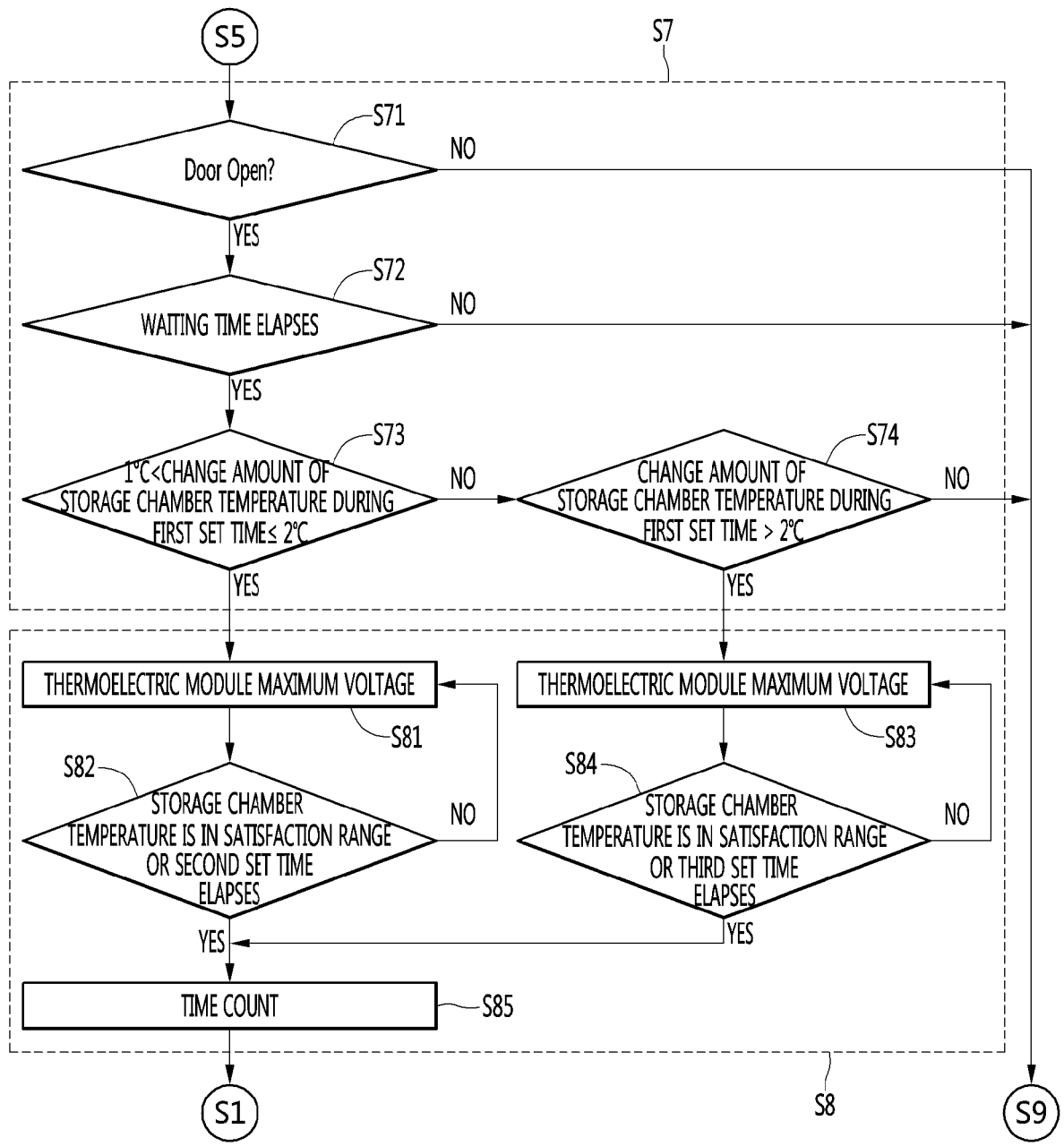
FIG. 10 is a flowchart illustrating the load-corresponding operation illustrated in FIG. 6.

FIG. 10 is a flowchart illustrating the load-corresponding operation illustrated in FIG. 6. The control unit 9 may determine whether or not the refrigerator is in the condition of the load-corresponding operation and may determine whether or not to perform the load-corresponding operation in a case of a plurality of load-corresponding operations (S71) (S72) (S73) (S74). The control unit 9 may determine whether or not the load-corresponding operation is entered and the type of the load-corresponding operation according to the temperature change value in the storage chamber S when the door 2 may be opened and the waiting time elapses.

Here, the waiting time may be a time set for limiting the re-input of the load-corresponding operation, and for example, may set to 10 minutes or the like. When the opening of the door 2 is detected, the control unit 9 may compare the time counted from the completion of the previous load-corresponding operation with the waiting time. The control unit 9 may compare the time counted in the timer (not illustrated) with the waiting time from the completion of the load-corresponding operation.

It may be preferable that the load-corresponding operation may be not performed too often and may be performed only when necessary. When the waiting time does not elapse after the completion of the previous load-corresponding operation, the refrigerator may not enter the load-corresponding operation, and after the waiting time elapses, the new load-corresponding operation may be entered.

The control unit 9 may determine any one of the plurality of load-corresponding operations according to the storage chamber temperature change value. The plurality of load-corresponding operations may be operations whose times may be different from each other. The control unit 9 may control differently the time of the load-corresponding operation according to the storage chamber temperature change value when the door 2 may be opened and the waiting time elapses.

When the counted time from the timer elapses, the control unit 9 may determine any one of no entry of the load-corresponding operation, first load-corresponding operations S81, S82, and S83, and second load-corresponding operations S84, S85, and S86 according to the temperature change value in the storage chamber S.

The first load-corresponding operation may be an operation in which the maximum voltage may be applied to the thermoelectric module 3 during the second set time when the door 2 is opened, the waiting time elapses, and the storage chamber temperature change value during the first set time after door 2 may be opened may be in the first change value (S81) (S82). Here, the first set time may be a time to detect a sudden change in the load due to the opening of the door 2, such as 1 to 5 minutes.

The first change value range may be a range capable of detecting a temperature change value in the storage chamber S when the door 2 may be opened, such as minimum 1° C. and maximum 2° C. The second set time may be set to a time that may be solved by applying the maximum voltage to the thermoelectric module 3 with a load change caused by the opening of the door 2, such as one hour.

For example, the first set time may be 3 minutes, the first change value range may be minimum 1° C. and the maximum 2° C., and the second set time may be 1 hour. When the door 2 is opened, the waiting time elapses, and the temperature change value for 3 minutes after opening the door 2 may be minimum 1° C. and the maximum 2° C., the control unit 9 determines as the first load-corresponding operation and may apply the maximum voltage to the thermoelectric module 3 for 1 hour. The control unit 9 may control each of the wind speed of the cooling fan 4 and the wind speed of the heat-radiation fan 5 at a medium-speed for one hour during which the first load-corresponding operation is continued.

On the other hand, when the temperature of the storage chamber S reaches the load-corresponding operation termination temperature before the second set time may be reached after the first load-corresponding operation may be started, the control unit 9 may terminate the first load-corresponding. Here, the load-corresponding operation termination temperature may be a time set for forcible termination of the first load-corresponding operation and may be set to be lower than the target temperature. The load-corresponding operation termination temperature may be set to a temperature which may be 2° C. lower than the target temperature.

When the door 2 may be opened, the waiting time elapses, and the storage chamber temperature change value is within the second change value range for the first set time after the door 2 may be opened, the second load-corresponding operation may apply the maximum voltage to the thermoelectric module 3 during the third set time, which may be longer than the second set time.

The second change value range may be a range for detecting a relatively large load change and may be larger than the first change value range. The first change value may range between a minimum of 1° C. and a maximum of 2° C., and the second change value range may be in a range exceeding 2° C.

The third set time may be a time set to correspond to a relatively large load change and may be set to be about 10 minutes to 50 minutes longer than the second set time. For example, when the second set time may be one hour, the third set time may be one hour and 30 minutes. For example, when the first set time is 3 minutes, the second change value range may be more than 2° C., and the third set time may be one hour and 30 minutes, and when the door 2 is opened, the waiting time elapses, and the temperature change value for 3 minutes after the door 2 is opened exceeds 2° C., the control unit 9 may determine as the second load-corresponding operation and may apply the maximum voltage to the thermoelectric module 3 for one hour and 30 minutes. The control unit 9 may control the wind speed of the cooling fan 4 and the wind speed of the heat-radiation fan 5 at a medium-speed, respectively, for one hour and 30 minutes in which the second load-corresponding operation may be continued.

On the other hand, when the temperature of the storage chamber S reaches the load-corresponding operation termination temperature before the third set time is reached after the second load-corresponding operation starts, the control unit 9 may also terminate the second load-corresponding operation, such as termination of the first load-corresponding operation. Here, the load-corresponding operation termination temperature of the second load-corresponding operation may be set to be substantially equal to the load-corresponding operation termination temperature of the first load-corresponding operation and may be a temperature that may be set to be 2° C. lower than the target temperature.

On the other hand, when the door 2 is opened and the waiting time elapses and the storage chamber temperature change value for the first set time after the door 2 may be opened may be smaller than the minimum of the first change value range, the control unit 9 may not enter the first load-corresponding operation and the second load-corresponding operation described above. Even if the door 2 may be opened and the waiting time elapses, when the storage chamber temperature change value may be insignificant during the first set time after the door may be opened since the load change according to the opening of the door 2 may be not large, the control unit 9 may not start a separate load-corresponding operation.

When the first load-corresponding operation or the second load-corresponding operation are terminated, as described above, the control unit 9 may count the time again using the timer (S85). The time counted in this way may be compared with the waiting time for determining the condition of the load corresponding operation (refer to S72).

An aspect of the present disclosure provides a refrigerator which can minimize a temperature variation within a storage chamber which occurs when the outside temperature is high and which minimizes the corruption of foods or medicines in the storage chamber. Another aspect of the present disclosure provides a refrigerator which can minimize the noise of a cooling fan and a heat-radiation fan and can minimize temperature variation in the storage chamber when the storage chamber temperature is low.

According to an embodiment of the present disclosure, there is provided a refrigerator including: a main body having a storage chamber; a door for opening and closing the storage chamber; a thermoelectric module having a cooling sink for cooling the storage chamber and a heat sink for radiating heat sucked by the cooling sink; a cooling fan for circulating air to the cooling sink and the storage chamber; a heat-radiation fan for flowing outside air to the heat sink; and a control unit for controlling the thermoelectric module, the cooling fan, and the heat-radiation fan.

When the outside temperature exceeds the set temperature, the control unit can rotate each of the cooling fan and the heat-radiation fan at a high-speed. When the outside temperature is equal to or lower than the set temperature and the storage chamber temperature is in the upper limit range, the control unit can rotate each of the cooling fan and the heat-radiation fan at a medium-speed lower than a high-speed.

When the outside temperature is equal to or lower than the set temperature and the storage chamber temperature is lower than the upper limit range, the control unit can rotate each of the cooling fan and the heat-radiation fan at a low-speed lower than a medium-speed.

The set temperature may be set to a temperature within an outside temperature range between the uppermost outside temperature range and the lowermost outer range of the plurality of outside temperature ranges. The control unit may turn off each of the cooling fan and the heat-radiation fan, respectively, when the storage chamber is opened.

The control unit can turn off the thermoelectric module and rotate the cooling fan, during the defrosting operation. The control unit may keep turning-off of the heat-radiation fan during the heat-radiation fan turning-off set time from the time when the thermoelectric module is turned off. The control unit may rotate the heat-radiation fan when the heat-radiation fan turning-off set time elapses during the heat-radiation fan turning-off.

The control unit can rotate the cooling fan and the heat-radiation fan at a medium-speed when the cooling fan and the heat-radiation fan are rotated in the defrosting operation. At the time of initial power input, the control unit can rotate each of the cooling fan and the heat-radiation fan at a high-speed or a medium speed. At the time of initial power input, the control unit can rotate each of the cooling fan and the heat-radiation fan at a medium-speed when the storage chamber temperature reaches the dissatisfaction range.

When the outside temperature is equal to or lower than the set temperature, the door is opened, and the waiting time elapses, the control unit can differently control the time of the load-corresponding operation according to the storage chamber temperature change value.

When the outside temperature is equal to or lower than the set temperature, the door is opened, and the waiting time elapses, and the storage chamber temperature change value during a first set time after door opening is in a first change value range, the control unit can perform a load-corresponding operation in which each of the cooling fan and the heat-radiation fans is rotated at a medium-speed during a second set time.

When the outside temperature is equal to or lower than the set temperature, the door is opened, the waiting time elapses, and the storage chamber temperature change value during a first set time after door opening is in a second change value range that is larger than the first change value range, the control unit can perform the load-corresponding operation in which each of the cooling fan and the heat-radiation fans is rotated at a medium-speed during a third set time. The second change value range may be larger than the first change value range. The third set time may be longer than the second set time.

When the outside temperature is equal to or lower than the set temperature and the outside temperature range is changed, the control unit can rotate each of the cooling fan and the heat-radiation fan at a medium-speed. When changing the outside temperature range, the control unit can keep each of the cooling fan and the heat-radiation fan at a medium-speed until the storage chamber temperature is in the satisfaction range.

When the outside temperature is equal to or lower than the set temperature, and the storage chamber temperature is a dissatisfaction range one level lower than the upper limit range, a satisfaction range one level lower than the dissatisfaction range, or a lower limit range one level lower than the satisfaction range, the control unit can rotate each of the cooling fan and the heat-radiation fan at a low-speed.

According to another embodiment of the present disclosure, there is provided a refrigerator including: a main body having a storage chamber; a door for opening and closing the storage chamber; a thermoelectric module having a cooling sink for cooling the storage chamber and a heat sink for radiating heat sucked by the cooling sink; a cooling fan for circulating air to the cooling sink and the storage chamber; a heat-radiation fan for flowing outside air to the heat sink; and a control unit for controlling the thermoelectric module, the cooling fan, and the heat-radiation fan, and the control unit can rotate the cooling fan and the heat-radiation fan at a medium-speed or a high-speed during a defrosting operation and initial power input.

When the defrosting operation is not performed, the initial power input is not performed, and the outside temperature exceeds the set temperature, the control unit can rotate each of the cooling fan and the heat-radiation fan at a high-speed.

When the defrosting operation is not performed, the initial power input is not performed, the outside temperature is equal to or lower than the set temperature and the storage chamber temperature is in the upper limit range, the control unit can rotate each of the cooling fan and the heat-radiation fan at a medium-speed lower than a high-speed.

When the defrosting operation is not performed, the initial power input is not performed, the outside temperature is equal to or lower than the set temperature, the load-corresponding operation is not performed, the outside temperature range is not changed, and the storage chamber temperature is lower than the upper limit range, the control unit can rotate each of the cooling fan and the heat-radiation fan at a low-speed lower than a medium-speed.

According to the embodiment of the present disclosure, when the outside temperature exceeds the set temperature, since each of the cooling fan and the heat-radiation fan is rotated at a high-speed regardless of the current temperature of the storage chamber, there are aspects in which the temperature deviation in the storage chamber, which can be generated when the outside temperature is high can be minimized and the corruption and deterioration of foods, medicines, or the like in the storage chamber are minimized.

In addition, when the outside temperature is equal to or lower than the set temperature and the storage chamber temperature is in the upper limit range, there is an aspect that each of the cooling fan and the heat-radiation fan is rotated at a medium-speed, so that the noise can be further minimized than in a case where each of the cooling fan and the heat-radiation fan is rotated at a high-speed.

In addition, when the outside temperature is equal to or lower than the set temperature and the storage chamber temperature is in a dissatisfaction range, the satisfaction range, or the lower limit range, there is an aspect that each of the cooling fan and the heat-radiation fan is rotated at a low-speed so that the noise can be minimized.

In addition, when the outside temperature is equal to or lower than the set temperature and the storage chamber temperature is in the lower limit range, there is an aspect that the temperature deviation in the storage chamber can be minimized, and the air in the storage chamber can defrost the thermoelectric module, as compared with a case where each of the cooling fan and the heat-radiation fan are rotated at a low-speed, and each of the cooling fan and the heat-radiation fan is turned off.

In addition, when the initial power input or the outside temperature range change is performed, there is an aspect that the cooling fan and the heat-radiation fan can be rotated at a medium-speed to quickly relieve the load. In addition, there is an aspect that the load change size due to the opening of the door is detected, and the cooling fan and the heat-radiation fan are rotated at a medium-speed during the optimum set time accordingly so that the abrupt load change due to the door opening can be quickly responded.

In addition, when the defrosting operation is performed, the thermoelectric module is turned off, the cooling fan is rotated, the cooling sink of the thermoelectric module is defrosted by the air in the storage chamber, and the cooling sink of the thermoelectric module can be defrosted without a separate defrost heater.

In addition, since the turning-off of the heat-radiation fan is kept during the heat-radiation fan turning-off set time from the time when the thermoelectric module is turned off, there is an aspect that the heat of the heat sink of the thermoelectric module can be quickly conducted to the cooling sink of the thermoelectric module during the heat-radiation fan turning-off set time, and the cooling sink of the thermoelectric module can be defrosted more quickly.

The description above is merely illustrative of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to explain the technical idea of the present disclosure and the scope of the technical idea of the present disclosure is not limited by these embodiments.

The protection scope of the present disclosure should be construed according to the following claims, and all technical ideas within the scope of equivalents thereof should be construed as being included in the scope of the present disclosure.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerator comprising:
    a main body having a storage chamber;
    a door that opens and closes the storage chamber;
    a thermoelectric module (TEM) having a cooling sink that absorbs heat to cool the storage chamber and a heat sink that radiates the heat absorbed by the cooling sink;
    a cooling fan that circulates air to the cooling sink and the storage chamber;
    a heat radiation fan that causes outside air to flow to the heat sink; and a controller that manages the TEM, the cooling fan, and the heat-radiation fan, wherein, when an outside temperature that is measured outside of the storage chamber exceeds a set temperature, the controller instructs each of the cooling fan and the heat-radiation fan to operate at a high-speed, wherein, when the outside temperature is equal to or lower than the set temperature and a storage chamber temperature that is measured in the storage chamber is in an upper limit range, the controller instructs each of the cooling fan and the heat-radiation fan to operate at a medium-speed that is lower than the high-speed, wherein, when the outside temperature is equal to or lower than the set temperature and the storage chamber temperature is lower than the upper limit range, the controller instructs each of the cooling fan and the heat-radiation fan to operate at a low-speed that is lower than the medium-speed, wherein the controller turns off the TEM and instructs the cooling fan to rotate during a defrosting operation, and wherein the controller turns off the heat-radiation fan during a heat-radiation fan turning-off set time that begins after the TEM is turned off during the defrosting operation.

2. The refrigerator according to claim 1,
wherein the set temperature is set within an outside temperature range that is between an uppermost outside temperature range and a lowermost outer range of a plurality of outside temperature ranges associated with the refrigerator.

3. The refrigerator according to claim 1,
wherein the controller turns off each of the cooling fan and the heat-radiation fan, respectively, when the storage chamber is opened.

4. The refrigerator according to claim 1,
wherein the controller reactivates the heat-radiation fan after the heat-radiation fan turning-off set time elapses.

5. The refrigerator according to claim 1,
wherein the controller instructs the cooling fan and the heat-radiation fan to operate at the medium-speed when the cooling fan and the heat-radiation fan are activate during the defrosting operation.

6. The refrigerator according to claim 1,
wherein at a time of initial power input, the controller instructs each of the cooling fan and the heat-radiation fan to rotate at the high-speed or at the medium speed.

7. The refrigerator according to claim 6,
wherein at the time of initial power input, the controller instructs each of the cooling fan and the heat-radiation fan to rotate at the medium-speed when the storage chamber temperature reaches a dissatisfaction range that is lower than the upper limit range.

8. The refrigerator according to claim 1,
wherein, when the outside temperature is equal to or lower than the set temperature, the door is opened, and a waiting time elapses, the controller changes a timing of a load-corresponding operation according to a storage chamber temperature change value.

9. The refrigerator according to claim 1,
wherein when the outside temperature is equal to or lower than the set temperature, the door is opened, a waiting time elapses, and a storage chamber temperature change value during a first set time after door opens is in a first change value range, the controller performs a load-corresponding operation such that each of the cooling fan and the heat-radiation fans rotates at the medium-speed during a second set time.

10. The refrigerator according to claim 9,
wherein when the outside temperature is equal to or lower than the set temperature, the door is opened, the waiting time elapses, and the storage chamber temperature change value during the first set time after door opening is in a second change value range that is larger than the first change value range, the controller performs the load-corresponding operation such that each of the cooling fan and the heat-radiation fans rotates at a medium-speed during a third set time, and
wherein the third set time is longer than the second set time.

11. The refrigerator according to claim 1,
wherein when the outside temperature is equal to or lower than the set temperature and an outside temperature range is changed, the controller instructs each of the cooling fan and the heat-radiation fan to rotate at the medium-speed.

12. The refrigerator according to claim 11,
wherein when changing the outside temperature range, the controller instructs each of the cooling fan and the heat-radiation fan to rotate at a medium-speed until the storage chamber temperature is in a satisfaction range that is lower than the upper limit range.

13. The refrigerator according to claim 1,
wherein when the outside temperature is equal to or lower than the set temperature, and the storage chamber temperature is in one of a dissatisfaction range that is lower than the upper limit range, a satisfaction range that is level lower than the dissatisfaction range, or a lower limit range that is lower than the satisfaction range, the controller instructs each of the cooling fan and the heat-radiation fan to rotate at a low-speed.

14. The refrigerator according to claim 1, wherein the main body includes:
an inner case;
an outer cabinet provided outside of the inner case; and
a cabinet bottom positioned below the inner case, and
wherein air heat-exchanged with the heat is guided to a lower heat-radiation flow path formed between the outer cabinet and the cabinet bottom.

15. A refrigerator comprising:
a main body having a storage chamber;
a door that opens and closes the storage chamber;
a thermoelectric module (TEM) having a cooling sink that absorbs heat to cool the storage chamber and a heat sink that radiates the heat absorbed by the tooling sink;
a cooling fan that circulates air to the cooling sink and the storage chamber;
a heat-radiation fan that causes outside air to flow to the heat sink; and
a controller that manages the thermoelectric module, the cooling fan, and the heat radiation fan,
wherein the controller instructs the cooling fan and the heat-radiation fan to rotate at a medium-speed or a high-speed during a defrosting operation and an initial power input,
wherein, when the defrosting operation is not being performed, the initial power input is not being performed, and an outside temperature measured outside the storage chamber exceeds a set temperature, the controller instructs each of the cooling fan and the heat-radiation fan to rotate at a high-speed,
wherein, when the defrosting operation is not being performed, the initial power input is not being performed, the outside temperature is equal to or lower than the set temperature, and a storage chamber temperature measured outside the storage chamber is in an upper limit range, the controller instructs each of the cooling fan and the heat-radiation fan to rotate at a medium-speed that is lower than the high-speed, and wherein when the defrosting operation is not being performed, the initial power input is not being performed, the outside temperature is equal to or lower than the set temperature, a load-corresponding operations not being performed, an outside temperature range is not changed, and the storage chamber temperature is lower than the upper limit range, the controller instructs each of the cooling fan and the heat-radiation fan to rotate at a low-speed that is lower than the medium-speed, wherein the controller turns off the thermoelectric module and instructs the cooling fan to rotate during the defrosting operation, and wherein the controller instructs the heat-radiation fan to begin resume rotating after a heat-radiation fan turning-off set time lapses, the heat-radiation fan turning-off set time beginning when the thermoelectric module is turned off.

16. The refrigerator according to claim 15,
wherein the set temperature is set to a value within an outside temperature range that is between an uppermost outside temperature range and a lowermost outer range of a plurality of outside temperature ranges for the refrigerator.

17. The refrigerator according to claim 15,
wherein when the outside temperature is equal to or lower than the set temperature, the door is opened, awaiting tittle elapses, and a storage chamber temperature change value during a first set time after the door opens is in a first change value range, the controller performs a load-corresponding operation such that each of the cooling fan and the heat-radiation fans rotates at a medium-speed during a second set time, wherein when the outside temperature is equal to or lower than the set temperature, the door is opened, the waiting time elapses, and the storage chamber temperature change value during the first set tune after door opening is in a second change value range that is larger than the first change value range, the controller performs the load-corresponding operation such that each of the cooling fan and the heat-radiation fans is rotated at a medium-speed during a third set time, and wherein the third set time is longer than the second set dine.

18. The refrigerator according to claim 15,
wherein when the outside temperature is equal to or lower than the set temperature and an outside temperature range is changed, the controller instructs each of the cooling fan and the heat-radiation fan to rotate at a medium speed.

19. The refrigerator according to claim 15,
wherein when the outside temperature is equal to or lower than the set temperature, and the storage chamber temperature is in one of a dissatisfaction range that is lower than the upper limit range, a satisfaction range that is lower than the dissatisfaction range, or a lower limit range that is lower than the satisfaction range, the controller instructs each of the cooling fan and the heat-radiation fan to rotate at a low-speed.

20. The refrigerator according to claim 15, wherein the main body eludes:
an inner case;
an outer cabinet provided outside of the inner case; and
a cabinet bottom positioned below the inner case, and
wherein air heat-exchanged with the heat sink is guided to a lower heat-radiation flow path formed between the outer cabinet and the cabinet bottom.

\* \* \* \* \*